Aug. 16, 1960  J. P. ECKERT, JR  2,949,230
PARALLEL BINARY ADDER UNIT
Filed Aug. 9, 1955  10 Sheets-Sheet 1
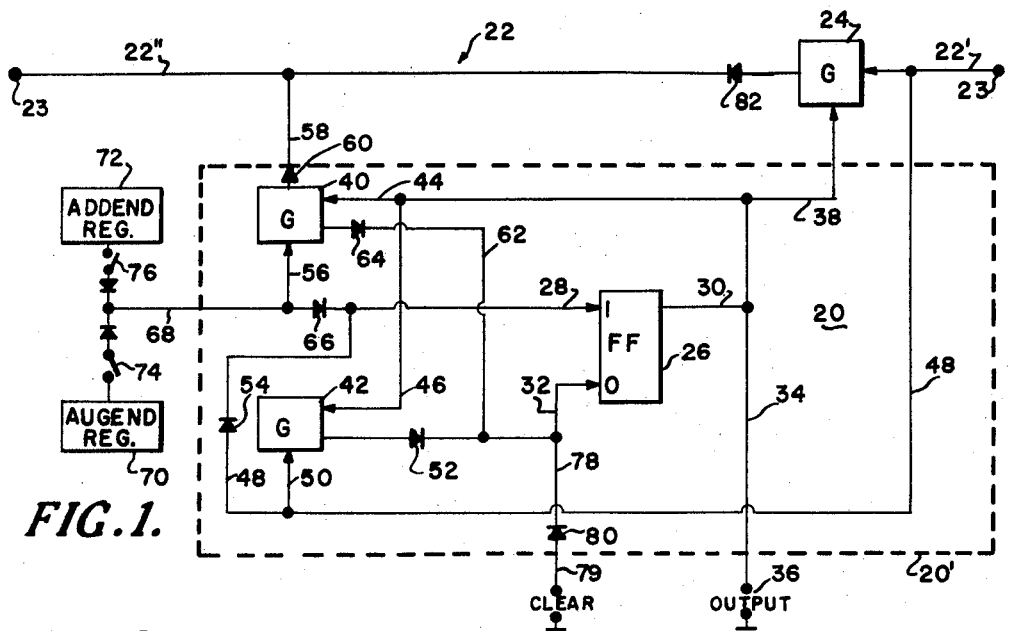
FIG.1.
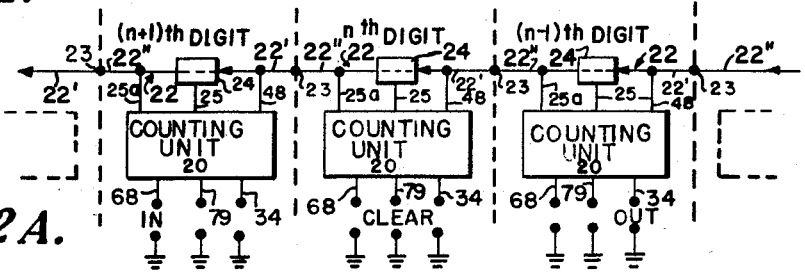
FIG.2.
FIG.2A.
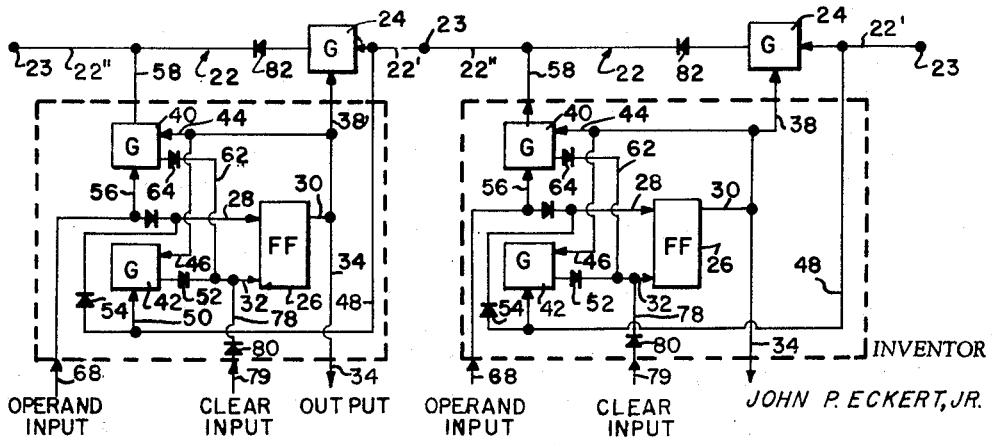
INVENTOR
JOHN P. ECKERT, JR.
BY Charles C. English
AGENT INVENTOR
JOHN P. ECKERT, JR.
BY Charles C. English
AGENT

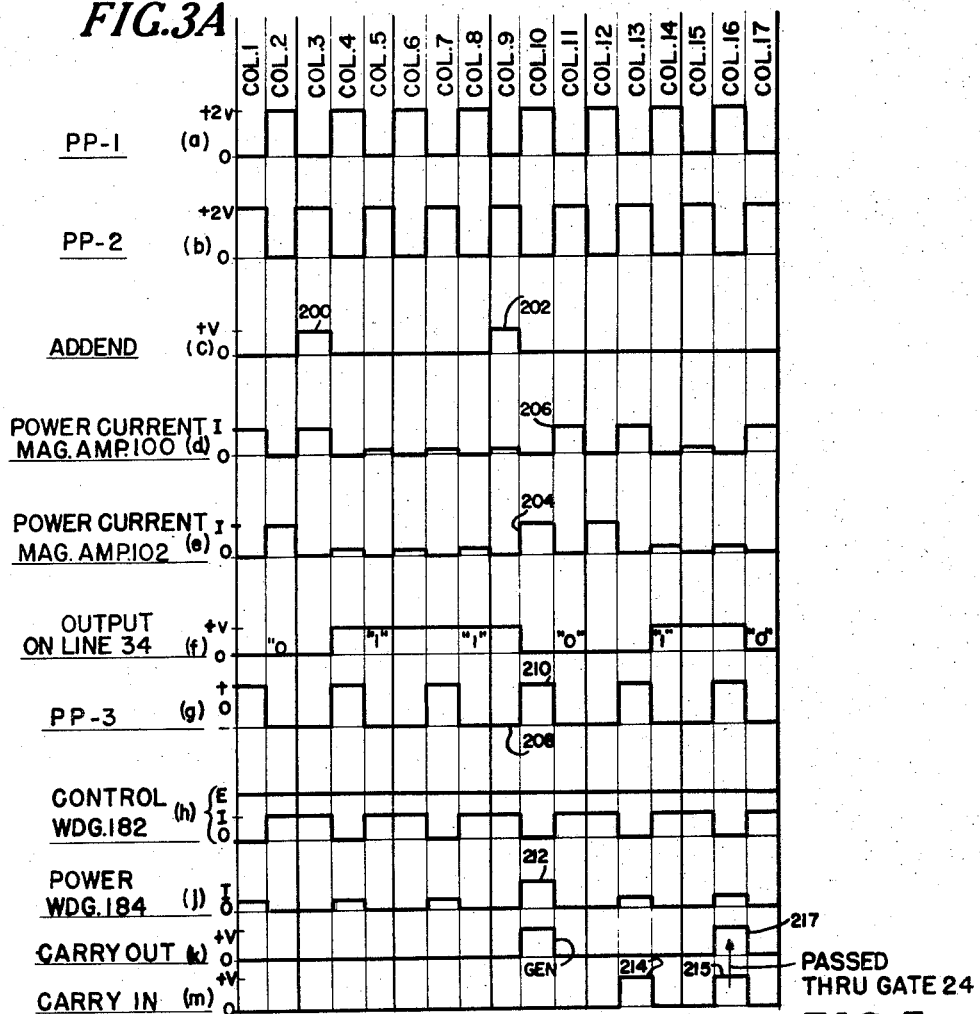
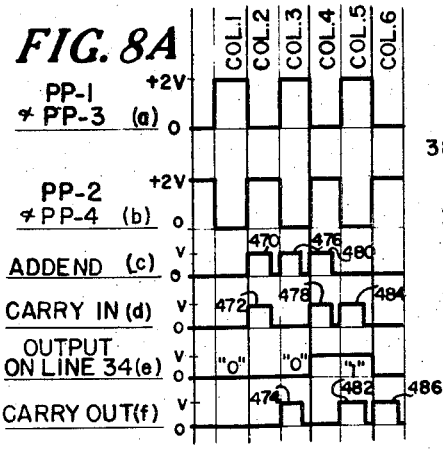
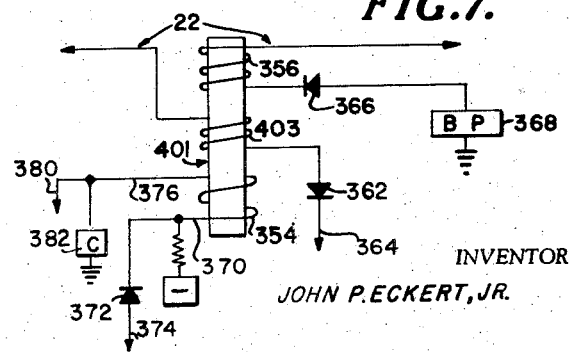

Aug. 16, 1960

J. P. ECKERT, JR 2,949,230

PARALLEL BINARY ADDER UNIT

Filed Aug. 9, 1955

INVENTOR
JOHN P. ECKERT, JR.

BY Charles C. English

AGENT

INVENTOR
JOHN P. ECKERT, JR.

BY Charles C. English
AGENT

Aug. 16, 1960

J. P. ECKERT, JR 2,949,230

PARALLEL BINARY ADDER UNIT

Filed Aug. 9, 1955

INVENTOR
JOHN P. ECKERT, JR.

BY Charles C. English

AGENT

United States Patent Office 2,949,230
Patented Aug. 16, 1960

2,949,230

PARALLEL BINARY ADDER UNIT

John Presper Eckert, Jr., Philadelphia, Pa., assignor to Sperry Rand Corporation, New York, N.Y., a corporation of Delaware Filed Aug. 9, 1955, Ser. No. 527,223

45 Claims. (Cl. 235—175)

This invention relates to parallel arithmetic systems and to binary digital arithmetic units for use therein.

One phase of the invention relates to arithmetic elements such as adder units and systems therefore which include means for rapidly propagating a carry. This aspect of the invention particularly relates to means for propagating a carry through passive elements so that the carry is propagated without delay, especially that caused by time required for vacuum tube amplifiers, flip-flops, inverters and the like to function.

Another phase of the invention relates to arithmetic means comprising parallel adder units and systems including arrangements for operating the systems and units at such a rate of input that addend pulses may be incoming in every successive time period of the system even while carries produced by previous addends may be still in the course of propagation when new addends are introduced.

A third phase of the invention relates to the organization of parallel arithmetic units into ranks or hierarchies so that a carry originating in one group of units may be propagated so as to bypass other groups, the arrangement still permitting the initiation of appropriate carries within the units of each group, and allowing such action to occur simultaneously in all of the groups of units.

It is therefore an object of the present invention to provide improved parallel arithmetic units and systems.

It is a further object of the invention to provide improved parallel adder units comprising components which are electrically passive so as to reduce carry propagation times and otherwise shorten the operating periods of the units.

It is an object of the invention to provide parallel adder units using bistable magnetic devices for accumulation of sums.

It is a further object of this invention to provide improved parallel adder units, components of which comprise electronically passive elements such as diode gates, approximately constant current sources and sinks, magnetic gates connected in series or in parallel, gates consisting of pulse transformers connected by diodes or similar non-linear devices, and related devices.

It is a further object of this invention to provide adder units and systems therefor for operation at rates such that addend pulses may be introduced in every successive time period of the system even while carries produced by previous addends are still in the course of propagation when new addends are fed in.

It is a further object of this invention to arrange parallel adder units of a parallel adder system into ranks or hierarchies so that a carry originated in one group of adder units may be propagated at a higher level past other groups of adder units.

It is a further object of this invention to place amplification devices in an organization of adder units as in the preceding object so as to introduce minimum delay times.

It is a further object of this invention to provide in a system of adder units organized with ranks or hierarchies of carry propagation means, such arrangement of hierarchies with respect to the arrangement of groups of adder units that minimum time delays in carry propagation are experienced.

Further objects and the entire scope of the invention will become further apparent from the following detailed description of exemplary embodiments of the various phases of the invention.

The exemplary embodiments according to the invention may be best understood with reference to the accompanying drawings, wherein:

Figure 1 is a diagrammatic showing of an adder unit.

Figure 2 shows the organization of a plurality of units according to Figure 1 into a chain.

Figure 2A shows the interconnection of two units of Figures 1 or 2 in greater detail.

Figure 3A is a chart of waveforms pertaining to the embodiment of Figure 3.

Figure 7 shows a modified form of a part of the embodiment of Figure 6.

Figure 8A shows a chart of waveforms applicable to the embodiment of Figure 8.

Figure 3:
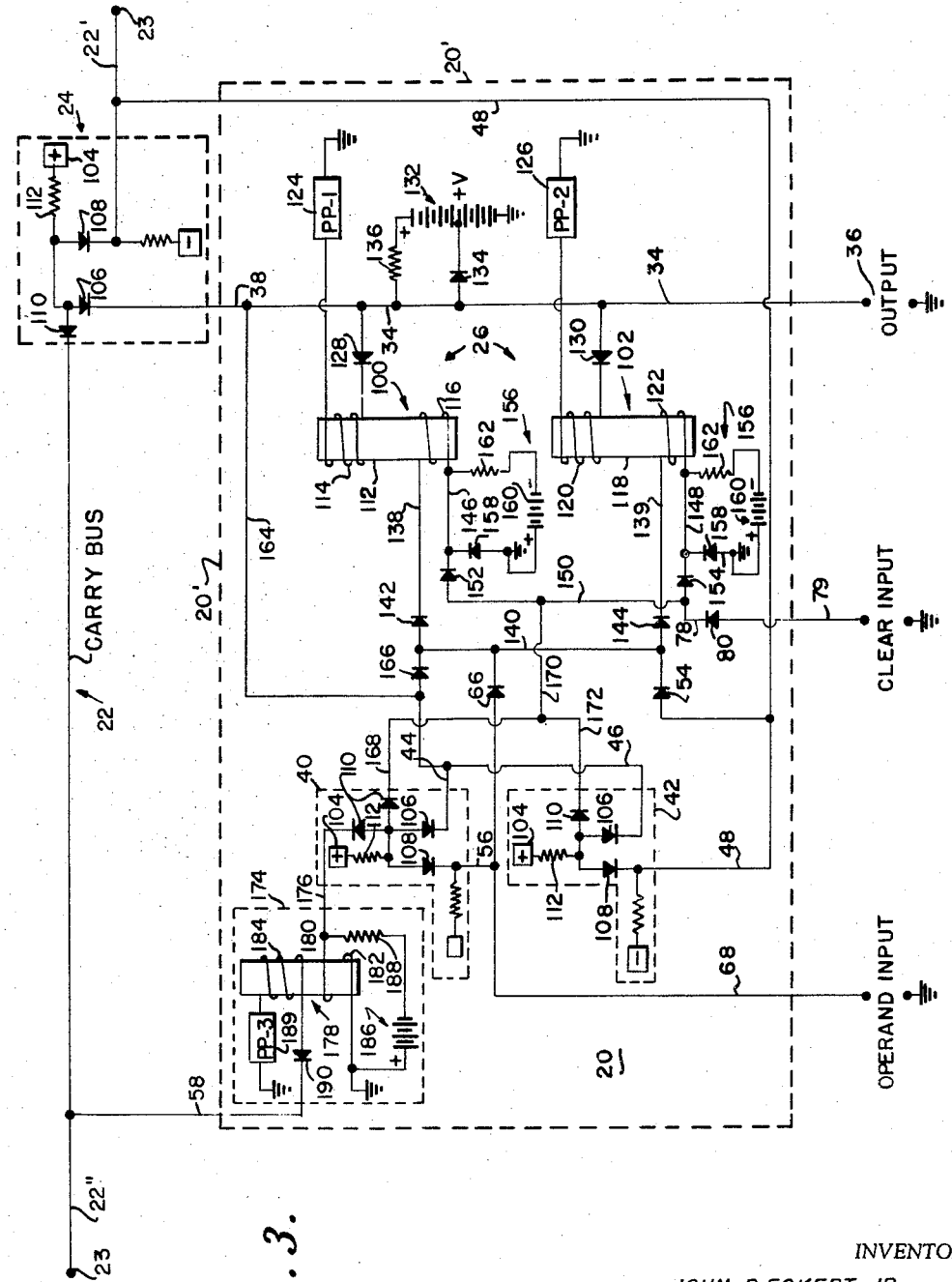
Figure 3 shows an embodiment of an adder unit.

Referring now to Figure 1, which illustrates one form of adder unit according to the invention in block diagram form, there is shown a binary parallel adder unit comprising a counting unit designated generally as 20 and contained within the dash line 20′. Further included in the adder unit 20 is a carry bus, designated generally by the numeral 22, having an incoming section 22′, an outgoing section 22″, and a carry gating control unit 24, all of which in conjunction with the counting unit 20 may operate to add augend and addend digits, receive carries, and generate carries if required onto the outgoing carry bus section 22″, all in accordance with the logic of binary addition.

A bistable circuit 26, designated also as FF for "flip-flop," is a basic accumulator within the counting unit 20. The bistable accumulator circuit 26 should be considered to operate in a flip-flop manner; that is, an input on line 28 to one side of the flip-flop produces a high level of potential on line 30, and an input on line 32 produces a low level of potential on line 30; however, an input on both lines 28 and 32 simultaneously or nearly so causes the circuit to change the level of potential on line 30 from what it was to the opposite state. The low level of potential on line 30 and consequently on line 34 and across the output 36 can be and herein is conveniently termed a "0" condition, whereas the higher level of potential on lines 30 and 34 is termed the "1" condition. The 0 and 1 conditions or states thus established can conveniently be utilized as representative of the summation of binary operands and carries introduced into the counting unit 20.

There is also connected to line 34 an input of the previously mentioned gate 24 over line 38 as well as an input to each of gates 40 and 42 via lines 44 and 46 respectively. These connections to gates 24, 40, and 42 from line 34 are for the purpose of enabling the gates when line 34 is in its 1 condition. The incoming section 22' of carry bus 22 is connected to a second input of gate 42 over lines 48 and 50. Consequently, when line 34 is in its 1 condition thereby enabling gate 42 and an incoming carry pulse on line 50 causes an output from gate 42 to line 32 via diode 52, bistable circuit 26 shifts to produce 0 condition on line 34. The incoming carry is also applied over line 28 from line 48 through diode 54 to the 1 input of bistable circuit 26. The arrival of the pulse on line 32 as caused by an incoming carry may be slightly later than, if not simultaneous with, the same carry pulse arriving on line 28 via diode 54, but no adverse effect will be experienced, as will become clear, and under these circumstances the bistable circuit 26 will allow line 34 to move to the 0 condition.

In addition to the input over line 44, gate 40 has another input from line 56. When line 34 is in its 1 condition, gate 40 is thereby enabled, and an input on line 56 causes an output over line 58 via diode 60 to the outgoing carry bus section 22". Gate 40 also has a second output over line 62 via diode 64, and consequently, in the presence of such an output, line 32 is raised in potential to cause bistable circuit 26 to move line 34 to its 0 condition. The input to gate 40 on line 56 is also applied to line 28 via diode 66, but this input may arrive at bistable accumulator circuit 26 slightly before, if not substantially simultaneously with, the output from gate 40 which causes line 32 to raise in potential; therefore, since accumulator 26 is in its 1 state when such inputs thereto occur, the input on line 28 has no effect on the accumulator and does not offset the effect of the same input on line 32. Bistable circuit 26, therefore, draws line 34 to its 0 condition.

The operand inputs arrive on line 68 from the augend register 70 and the addend register 72 when their respective switches 74 and 76 are closed momentarily. The operands consisting of augends and addends are assumed to stand in their respective registers 70 and 72, having been placed there by any desirable method, as by the use of conventional shift-register techniques.

The logic of binary addition is set out in the following table.

*Table A*

|     | Operands        |          | Initial Sum + | Carry In − | Total Sum + | Carry Out |
|-----|-----------------|----------|---------------|------------|-------------|-----------|
|     | Augend + Addend |          |               |            |             |           |
| (a) | (0              | 1)       | 1             | 0          | 1           | 0         |
|     | (1              | 0)       |               |            |             |           |
| (b) | 1               | 1        | 0             | 0          | 0           | 1         |
| (c) | 0               | 0        | 0             | 1          | 1           | 0         |
| (d) | (1              | 0)       | 1             | 1          | 0           | 1         |
|     | (0              | 1)       |               |            |             |           |
| (e) | 0               | 0        | 0             | 0          | 0           | 0         |
| (f) | 1               | 1        | 0             | 1          | 1           | 1         |

The operation of the adder unit of Figure 1 will now be explained in conformity with Table A above. With reference to the embodiment illustrated in Figure 1 (and to all other herein mentioned embodiments of this invention) it is assumed that all operand, clear, and carry pulses are positive pulses. Before addition begins with the adder unit of Figure 1, it will be assumed that a clear pulse has been applied to line 79, to diode 80, and thence to lines 78 and 32 to cause line 34 to be at its 0 condition. It will also be assumed that switches 74 and 76 are to be momentarily closed in succession by any conventional manner such as the use of the normally present clock pulses within a computer. (The actual timing of the arrival of the operand inputs and carry input and output will be referred to in more detail hereinafter.) On momentary closure of switch 74, the augend is applied to line 68, and, assuming the augend to consist of a "1" pulse, bistable circuit 26 will be energized to cause line 34 to move to its 1 condition. The augend 1 on line 68 produced no output from gate 40 since the gate was not previously enabled by a high level of potential on line 44. If switch 76 is now momentarily closed, the contents of addend register 72 will be applied to line 68. Assuming the addend to be "0" or a no-pulse, there will be no change in the 1 condition of line 34. The same 1 condition would be present on line 34 had the augend and addend been reversed, i.e., if the augend had been 0 and the addend had been 1. The result of the addition, then, conforms to line (a) of Table A. There being no incoming carry, the initial sum of the augend and addend equals the total sum.

For line (b) of Table A, the prevailing 1 condition of line 34 is assumed to represent the augend input, and upon momentary closure of switch 76, it is assumed that line 68 receives a pulse representative of 1. This pulse tends to hold bistable circuit 26 in its 1 condition, but gate 40 having been previously enabled by the high level of potential on lines 34 and 44, allows the addend 1 to effectively be present on lines 62 and 32 to shift the bistable circuit 26 and cause a 0 output condition on line 34. The initial sum then of 1+1 is 0, as shown in line (b) of Table A. Continuing with line (b), it is also assumed that no incoming carry pulse arrives on line 22', so that the total sum will also be 0. When gate 40 passed an output to line 62, there was also an output to line 58. This output represents the carry which is passed to the outgoing carry bus line 22", the positive carry pulse being prevented from moving along the carry bus towards the incoming carry bus line 22' by diode 82. Thus a 1+1 has produced a total sum of 0 and caused a carry to be propagated out of the adder unit.

The 0 condition of line 34 will be maintained if the next addend is 0 (the initial summation shown in line (c) is 0), and if there is a carry input following the initial summation, the carry pulse on line 22' will be prevented from passing through gates 24 and 42, but it will pass on through diode 54 to line 28 to shift bistable accumulator 26 to cause a 1 condition on line 34. Thus, a 0+0+carry-in has produced a 1 output as the total sum and no carry has been generated out, all in conformity with line (c) of Table A.

If a 0 addend is now presented to the adder unit on line 68 (assuming the total sum of 1 of line (c) to be the augend) the initial summation will remain 1. However, an incoming carry on line 48 will pass through enabled gate 42 to shift bistable circuit 26 and cause a 0 output, or total summation of 0, on line 34, the input on line 32 arriving slightly later than, if not simultaneous with, the input on line 28 from line 48. When the carry arrived on the incoming carry bus 22', gate 24 was enabled by the 1 condition of line 34, so that gate 24 effectively passes the incoming carry to the outgoing carry but line 22". Thus, a 1+0+carry-in has produced a 0 output and a carry has been passed. It will be appreciated that had the augend been 0 and the addend been 1 (instead of the reverse thereof), the same results would have been obtained. Thus, line (d) of Table A is satisfied.

When the augend and addend are each 0 and no incoming carry pulse arrives, there is no change in the state of the bistable circuit 26 and thus line 34 remains in its prior condition (assumed to be 0 for line (e) of Table A), and no carry is generated or passed to the outgoing carry bus line 22".

For line (f) of Table A, it is assumed the augend and addend are 1 (the accumulator 26 being previously cleared) so that the initial summation showing on line 34 is 0 and a carry output has been produced from gate 40, as was the case for line (b) of Table A. However, in line (f) a carry input is assumed to arrive on the incoming carry bus line 22'. Since this incoming carry arrives after the initial summation (that is, after line 34 has changed, if necessary, to represent the initial summation of the addend and augend), gates 24 and 42 are disabled by the 0 condition of line 34. Therefore, the incoming carry can pass over line 48 to line 28 only, the effect being a change of line 34 to its 1 condition. It should be noted here that the incoming carry was added in the total sum but the addition therein caused no generation of an outgoing carry, the outgoing carry being previously generated when the initial sum was being produced. Thus, in conformity with line (*f*) of Table A, a 1+1+carry-in has produced a 1 and a carry output.

The above described operation of the adder unit of Figure 1, is basic to each of the hereinafter described modifications of the adder unit. A plurality of similar units may be connected in a manner similar to that shown in Figure 2 to form a parallel binary adder system. The carry buses, designated generally as 22, are shown in Figure 2 with their incoming sections 22′ and outgoing sections 22″. The outgoing section 22″ for an adder column of a less significant digit is connected to the incoming carry bus section 22′ for the next digit of greater significance at terminal 23. Lines 25 interconnecting carry control gates 24 with their respective counting units 20, represent interconnections as required by various embodiments in accordance with this invention. Line 25*a* in Figure 2 is intended to represent generically a path for applying to outgoing bus section 22″ a carry generated within the counting unit 20.

Figure 2A illustrates in more detail the paralleling of two adder units, each being similar to the digit or column adder unit shown in Figure 1 with the exception of the removal of the addend and augend registers 72 and 70 and their respective switches 76 and 74, the input line 68 remaining to receive the operands.

Thus far, an adder unit according to the invention has been illustrated in block diagram form showing the use of gates and bistable circuits in general. However, unless these gates and bistable circuits are extremely fast in their operation, there will be some delay in the propagation of the pulses therethrough. In accordance with the present invention, so-called passive elements are utilized to provide faster operation in the gates and bistable circuits.

Figure 3 illustrates one embodiment of the invention using passive elements which will now be described in detail. Gates 24, 40 and 42 are like conventional constant current source diode-resistance gates, frequently called coincident circuits. In each gate constant current source 104 supplies current to the anodes of diodes 106, 108, and 110. The cathode of each of diodes 106 and 108 is normally at a potential lower than that of its respective plate, and consequently, current will flow through both diodes 106 and 108. Upon increasing the potential on the cathodes of both diodes 106 and 108 to a level such that neither diode can conduct, the voltage drop across resistor 112 decreases and the potential on the plate of diodes 110 becomes greater, thereby allowing diodes 110 to conduct current. As will be apparent, the cathode of diode 106 is raised in potential when the input line thereto, line 38, and consequently line 34, carries a high level of potential. A pulse arriving on the other input line (e.g., the incoming carry bus section 22′ to gate 24) will raise the cathode of diode 108. Under this condition of simultaneous lifting of the cathodes of diodes 106 and 108, diodes 110 will conduct and in effect pass a pulse (e.g., in gate 24, to the output carry bus section 22″). Gates 40 and 42 operate in a similar manner with gate 40 having two output diodes 110.

The counterpart of the bistable accumulator circuit 26 of Figure 1 includes in Figure 3 two magnetic amplifier circuits 100 and 102. Magnetic amplifier 100 has a magnetic core 112 (shown diagrammatically), a power or output winding 114, and an input or control winding 116, the windings 114 and 116 being wound on the core in the same relative direction. Magnetic amplifier 102 is similarly composed of a core 118 having thereon a power or output winding 120 and a similarly wound input or control winding 122. The core material for cores 112 and 118 is one having at least a quasi-rectangular hysteresis characteristic and is preferably of the square loop variety so that the residual flux density is a relatively large percentage of the flux density present during the application of a saturating magnetomotive force. Power winding 114 is pulsed by a source 124 of pulses PP–1 assumed to vary between zero (ground) and a potential greater than +V volts, as shown by waveform (*a*) of Figure 3A, +2V being taken as an exemplary potential. Power winding 120 is similarly pulsed by a source 126 of pulses PP–2 which are also assumed to vary between zero and a potential such as +2V volts. However, as shown in waveform (*b*) of Figure 3A, the PP–1 pulses and PP–2 pulses are 180° out of phase, that is, when PP–2 is at +2V volts, PP–1 is zero, and vice versa.

Power windings 114 and 120 are connected at their other ends to line 34, through diodes 128 and 130 respectively. Line 34 is coupled to a voltage +V tapped from a source of potential 132 and connected through overvoltage clamping diode 134. A resistor 136 connects line 34 and the source of potential 132 at a point higher than the reference voltage +V. It will be apparent then that current flows through resistor 136 and thence through each of diodes 128 and 130, power windings 114 and 120, and sources 124 and 126, respectively, to ground when power pulses PP–1 and PP–2 are at zero potential only, the +2V value of the pulses PP–1 and PP–2 raising the cathode of diodes 128 and 130, respectively, to block any current flow therethrough. The amount of current drawn through resistor 136 determines the state of line 34, a large amount of current causing a low voltage or the "0" state and a small amount the "1" state. The amount of this current depends upon the impedance of power windings 114 and 120, which impedance may be controlled by controlling the bistable remanence states of the cores 112 and 118. Each time a power pulse PP–1 or PP–2 allows the current from resistor 136 to pass through either windings 114 or 120, the current therethrough shifts or maintains the respective core in such a remanence state that its power winding presents a low impedance to the following current pulses from resistor 136 until the remanence state of the core is reverted by other means so that the power windings present a high impedance. Windings 116 and 122 are provided for the purpose of further controlling the impedance of power windings 114 and 120.

Control windings 116 and 122 have upper input lines 138 and 139, respectively, interconnected by line 140 via input diodes 142 and 144. The lower input lines 146 and 148 of control windings 116 and 122, respectively, are interconnected by line 150 via input diodes 152 and 154. A positive pulse on line 140 in the absence of current to line 150 causes current to flow through control windings 116 and 122 to shift the cores of each magnetic amplifier 100 and 102 to a remanence state causing high impedance in power windings 114 and 120 with respect to current from resistor 136. However, a positive pulse on line 140 substantially simultaneously with a positive input to line 150 inhibits current from flowing through either of control windings 116 and 122 by the opposing and nullifying action of said positive input to line 150 and thus, in effect, permits a shift of the cores of magnetic amplifiers 100 and 102 to a remanence state causing low impedance in power windings 114 and 120 with respect to current from resistor 136. Likewise, a positive pulse of current to line 150 in the absence of any input to line 140 sets the cores of magnetic amplifiers in a remanence state providing low impedance in windings 114 and 120.

A clamping circuit 156 is connected to each of the lower input lines 146 and 148 and is instrumental in allowing the just-mentioned combinations of inputs to lines 140 and 150 to cause said different impedance states of the cores 112 and 118. In these circuits clamping diodes 158 have their cathodes connected directly to the lines 146 and 148 while their anodes are connected to ground and to the positive side of the source of potential 160. Resistor 162 connects to the negative side of the potential 160 and to the lower input windings 146 and 148. Consequently, current flow within clamping circuits 156 is from ground through clamping diode 158, thence through resistor 162 and to the negative side of the source of potential 160. Therefore, the maximum current flow in control windings 116 and 122 as caused by an input to line 140 and thus to lines 138 and 139 is limited in magnitude to substantially the value of the current present in the respective resistors 162 when either of lines 146 or 148 is substantially at ground potential, said current flow through windings 116 and 122 being returned to ground via resistors 162. Inputs to line 150 raise the lower control lines 146 and 148 from ground potential; however, the currents therefrom do not pass through the control windings 116 and 122 but instead pass to ground through voltage dropping resistors 162 notwithstanding inputs to the upper control lines 138 and 139. The raised potential on the lower control lines 146 and 148 blocks any currents tending to flow from the upper control lines 138 and 139 through windings 116 and 122 and thereby allows a shift in the state of the accumulator 26 or magnetic amplifiers 100 and 102.

The level of potential on line 34 represents the state of the accumulator 26 and serves not only to feed the output 36 but to feed back over line 164 the 1 or 0 level of line 34 to line 140 via diode 166. Consequently, the upper control lines 138 and 139 of control windings 116 and 122 are constantly apprised of the state of line 34. This serves, in the absence of other inputs to control windings 116 and 122, to maintain a 1 state on line 34 since a high level of potential on line 140 reverts cores 112 and 118 back to the remanence state causing high impedance in power windings 114 and 120 (the previous zero excursion of each power pulse of sources 124 and 126 having allowed each core to be driven by current from resistor 136 to a remanence state causing low impedance in windings 114 and 120) so that only a small value of current may flow through power windings 114 and 120. Therefore, either magnetic amplifier 100 or 102, in the absence of external inputs to their control windings 116 and 122, respectively, prevents the power windings of the other magnetic amplifier from passing a large amount of current and reducing line 34 to "0" when there is feed back over line 164 to the upper input lines 138 and 139.

Gate 40 has an output line 168 connected by line 170 to line 150 and thus to both of the lower input lines 146 and 148 of the control windings 116 and 122. Gate 42 has an output line 172 similarly connected to said lower input lines 146 and 148. Line 140, which, as previously mentioned, is coupled to the upper input lines 138 and 139 of control windings 116 and 122, respectively, is also connected to operand input line 68 via diode 66. Line 68 also connects over line 56 to an input of gate 40. The incoming carry line 22' is connected to one input of gate 42 via line 48 which also connects to line 140 through diode 54.

Referring back to the accumulator circuit 26 including the magnetic amplifiers, it will now be apparent that the accumulator may operate as a bistable circuit in the nature of a conventional flip-flop circuit. Following a positive pulse to line 150, the circuit can "idle" and maintain the potential on line 34 relatively low (or at substantially 0 volts in keeping with the present example) to establish the "0" output state. Upon the occurrence of an input pulse on line 140 the accumulator will shift and then continue to "idle" maintaining the potential on line 34 at its relatively positive or "1" state.

In greater detail, a pulse on line 150 raises the potential of lines 146 and 148 to meet any positive potential on lines 138 and 139. Current cannot then pass through the control windings 116 and 122. Therefore, the next power current pulse in each of power windings 114 and 120 finds low impedance therethrough, and full power current is drawn through resistor 136 and the power windings during that pulse and during every successive power pulse PP–1 or PP–2 thereafter until an input is received upon line 140. In this "0" state of operation, due to the large voltage drop across resistor 136, line 34 and therefore the line 164 will not rise to any positive value such as would cause a reverting current to flow in the windings 116 and 122, from the lines 138 and 139 respectively, to ground. In this way, a pulse on line 150, which can be derived from the clear input line 79 or the line 170 from gates 40 and 42, causes the potential of line 34 to instantly drop to 0 and thereafter the accumulator 26 will "idle" in this state for the reason, as said, that no positive reverting potential can get to line 164.

The condition of the accumulator 26 can be shifted to a "1" state by a positive pulse potential on line 140 arriving via diode 66 and line 68 from the operand input or via diode 54 and line 48 from the carry input. The existence of a positive potential on line 140 at any instant of time will find one or the other of the power windings 114 or 120 drawing no current whatsoever since its respective power pulse is then at +2V volts. The reverting or resetting current from the positive potential on line 140 passes through the control winding 116 or 122 on the core that is not drawing power current to shift this core to its other remanence state. As a consequence the next attempt to draw a power pulse through the power winding of the shifted core will find a high impedance due to the fact that the power pulse must shift the core. The meeting of the high impedance limits the power current drawn through resistor 136 and the appropriate diode 128 or 130; consequently, during this power pulse half cycle the large voltage drop across resistor 136 will be reduced, and line 34 will move to its +V potential, or to its "1" state. The line 164 remains at this same potential and applies a reverting potential via diode 166 and line 140 to the other magnetic core in turn. From here on, in the absence of inputs to line 150, the combined circuits 100 and 102 will "idle" with the feedback potential on line 164 maintaining the cores 112 and 118 in the proper remanence state so as to hold line 34 in the "1" condition.

In order to be able to grade the power level of a generated carry pulse so there may be allowances for attenuation thereof in passage through subsequent carry bus gates (such as gate 24 in more significant digit adders) and for utilization of energy by subsequent adders, a carry amplifier circuit 174 (Figure 3) is connected to output line 176 of gate 40. The carry amplifier 174 may comprise a magnetic amplifier 178 having a core 180, a control winding 182, and a power winding 184. A source of constant potential 186 is connected at its negative end to a reverting resistor 188 which is connected at its other terminal to the output line 176 and further to an input of control winding 182. The other input of control winding 182 is connected to the positive side of source 186. Power winding 184 is connected at one end thereof to a source 189 of power pulses PP–3, and the other end of winding 184 is connected to line 58 via diode 190. Line 58 is further connected to the outgoing carry line 22'.

Power pulses PP–3 may vary above and below zero volts or ground level of potential, in the manner as shown in Figure 3A, waveform (g), their negative excursions serving to bias off diode 190 and positively prevent incorrect flux changes in core 180 as a result of possible and otherwise insignificant voltages on the carry bus 22. In the absence of an output on line 176, current from the constant voltage source 186 acts to reshift and therefore to hold the core 180 in a remanence state such that the positive excursion of pulses PP-3 will meet a high impedance in winding 184 and only a small amount of power pulse current passes through winding 184. Each positive excursion of pulses PP-3, however, drives the core 180 back into such a remanence state that the impedance of power winding 184 is low, as to pulses PP-3, but the impedance of control winding 182 is high as to current from source 186. Therefore, practically no current flows through winding 182 during that time, this amount of current being illustrated as zero in Figure 3A, waveform (h). However, during the off times or negative excursions of power pulses PP-3, current from source 186 flows through winding 182 and back through limiting resistor 188, thereby reverting core 180 to a remanence state causing high impedance in winding 184 to pulses PP-3. If during this time (that is, when PP-3 pulses are off or negative), a positive output appears on line 176 to oppose normal flow of current from source 186, the core 180 will not be reverted, winding 184 will remain at low impedance, and the following positive excursion of pulses PP-3 will allow a large amount of current to pass through winding 184 and diode 190. The power level of the pulse issuing onto line 56 may be regulated by the magnitude of the potentials 186 and power pulses PP-3 in source 189.

The operation of the adder unit of Figure 3 will now be explained in reference to the waveforms shown in Figure 3A. Assume column 1 of Figrue 3A shows that line 34 of Figure 3 (see waveform (f) of Figure 3A) is in its "0" state either by (1) two prior operand "1" inputs, or (2) a "1" and a carry-in, or (3) a clear input pulse on line 79. In that case, each magnetic amplifier 100 and 102 will have a relatively heavy periodical power current flow as shown in columns 1 and 2 by waveforms (d) and (e) of Figure 3A. If an addend 1 input (assumed to be +V volts in magnitude) arrives on line 68, as represented by pulse 200 (Figure 3A), the upper input lines 138 and 139 of control windings 116 and 122 will raise in potential and core 118 will be reversed in its remanence state. As a consequence, the impedance of both of the power windings magnetic amplifier is increased. However, the power pulses PP-2 being 180° out of phase with the pulses PP-1, will prevent the impedance of the power winding 114 of amplifier 100 from increasing until the following half cycle (column 4) of pulses PP-1, and this then by virtue of the feedback over line 164. It is apparent then that line 34 moves to its 1 state by the beginning of column 4 of Figure 3A and remains there because of the feedback over line 164 as hereinbefore explained. During the next half cycle, that is, the half cycle of power pulses occurring during column 5, the state of line 34 may be sensed by apparatus (not shown) at output 36.

If during the time when power pulses occurring in column 6 appear, no addend pulse arrives on line 68 and there is no carry input, line 34 will remain in its 1 state, so that the read out during the time for pulses in column 8 will be 1 in accordance with the waveform (f) in column 8 of Figure3A. Thus, so far, 0+1 or 1+0 has produced a 1 output and no carry in accordance with line (a) of Table A.

Assume now that another addend 1 pulse 202 (Figure 3A, column 9) is received on operand input line 68. Amplifier 102 at the beginning of column 10 will resume drawing heavy power pulse current as shown at 204 on waveform (e) of Figure 3A. The output of amplifier 100 changes at 206 at the beginning of column 11. At this time, the output on line 34 of Figure 3 (see waveform (f), Figure 3A) will move to its "0" state. Thus, 1+1 has produced a 0 for output 36, but in accordance with Table A, line (b), a carry pulse must be generated. This is accomplished as follows: As shown in waveform (g) of Figure 3A, power pulses PP-3 are regulated to be in their negative excursion or off during the time when addend pulses such as pulse 200 and pulse 202 might appear. Since during the time when pulse 202 appeared line 34 was in its 1 state, gate 40 was enabled by the high potential on line 44, and an output appeared from gate 40 on line 176. This output on line 176 occurs practically simultaneously with a portion of the negative excursion (e.g., at 208) of pulses PP-3 at which time current from constant potential source 186 (waveform (h) of Figure 3A) would normally be flowing. The output from gate 40 on line 176 opposes and cancels the normal effect of current from source 186, and consequently, during the following positive excursion 210 of pulses PP-3, a large surge of current passes through power winding 184 to the output line 56. The resulting current pulse 212 is shown in waveform (j) of Figure 3A. Waveform (k) of Figure 3A shows the resulting voltage pulse on carry output line 22″. Thus, a 1+1 has produced 0 for output 36 and has caused a generation of a carry-out pulse.

Let it next be assumed that no operand inputs (no pulses 200 and 202 or the like) arrive on line 68, but instead that a carry input pulse 214 (waveform (m) of Figure 3A) is timed to arrive during the power pulse half cycle following the normal occurrence of operand inputs (column 13 used for convenience; could be column 10 etc.). No output will issue from gate 24 since line 34 is at 0; however, the carry pulse will pass through diode 54 and act on amplifiers 100 and 102 so that line 34 will move to the higher level of potential to provide a 1 output. Therefore, during the read out time (column 14) line 34 will be at 1 (waveform (f) of Figure 3A). Thus, the addition of 0 and a carry has provided a total summation of 1 and no carry output has been produced. Line (c) of Table A is thus satisfied.

Now assume the 1 output now standing in the counter is the augend and further assume that no addend pulse arrives but that there is a carry input pulse 215 from the incoming carry bus line 22′. Gate 24 is open and the carry passes to carry output line 22″ through diode 110 of gate 24 as pulse 217 of Figure 3A, waveform (k). Additionally, incoming carry pulse 215 also passes through gate 42 and shifts output line 34 to 0. Thus, in adding to an augend of 1 an addend of 0 (or vice versa) and a carry, the total summation has been 0 with a carry output in accordance with line (d) of Table A.

From Figure 3A it may be observed that the total time required for complete addition in n parallel adder units of two numbers containing n sets of augend and addend digits, assuming the augend already inserted into the adder units, is three pulse widths of either pulses PP-1 or PP-2, or in other words, 1½ power pulse cycles. During the first pulse width (e.g., columns 3, 6, 9, 12, 15) the reading in of the addend occurs; during the second pulse width (e.g., columns 1, 4, 7, 10, 13, 16) a carry is generated or passed to the carry output if the logic of addition requires a carry output; and during the third pulse width (e.g., columns 2, 5, 8, 11, 14, 17) the reading out or application of the total summation is possible. Therefore, it will be seen that only one pulse width intervenes between the reading in of the addend and the reading out of the complete summation. The operation is, therefore, much more rapid than that of prior art devices, wherein at least n pulse times are required to make n carries with about five pulse times usually being necessary on that account.

Figure 4:
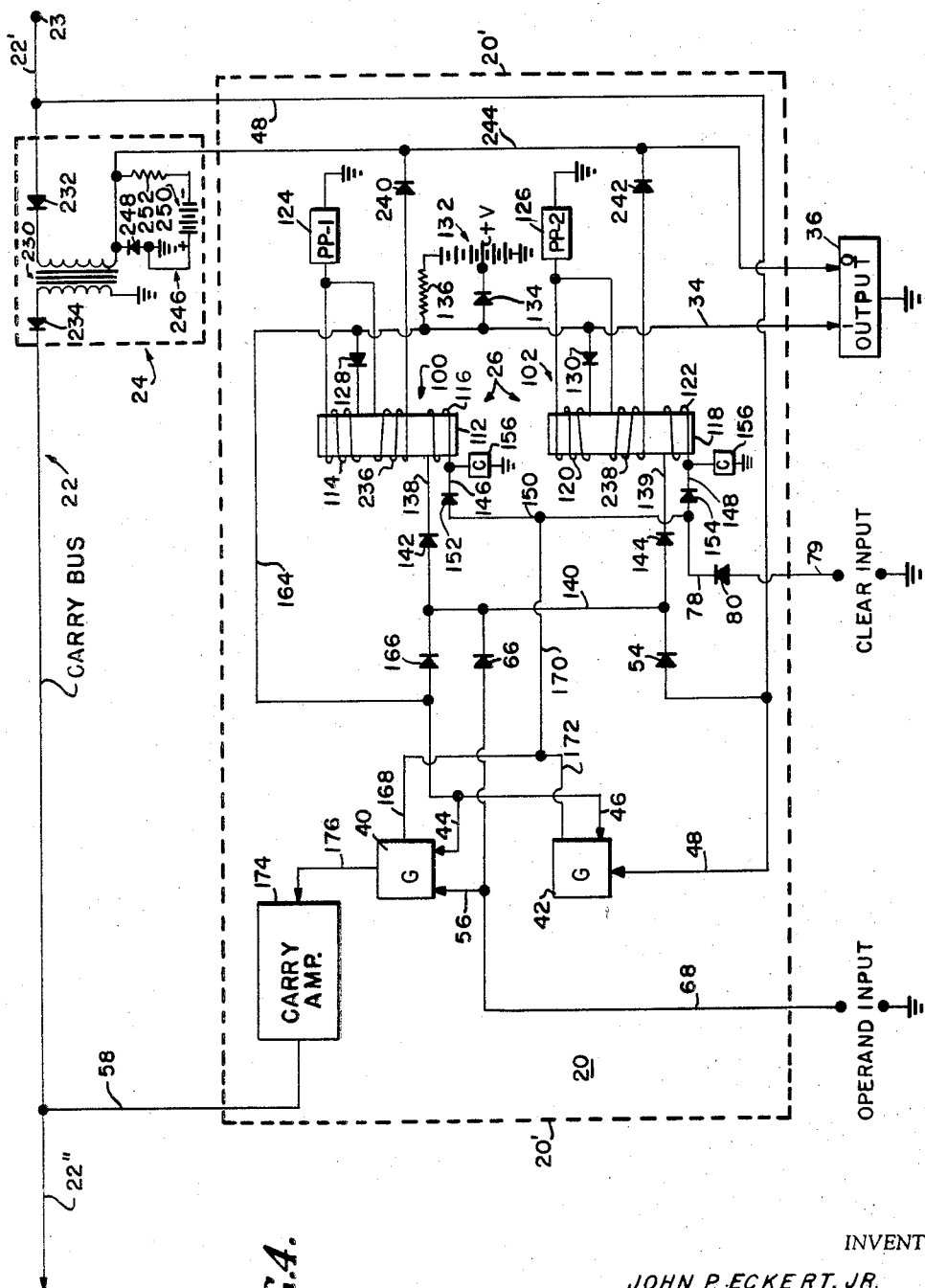
Figure 4 shows a further embodiment of an adder unit.

Figure 4 shows a modification of the invention and particularly of the carry control gate 24. Gate 24 may take the form of a pulse transformer 230 with one end of the primary winding thereof being connected to the incoming carry bus line 22′ via diode 232. The corresponding output terminal of the secondary winding is connected to the outgoing carry bus line 22″ through diode 234 with the opposite terminal of the secondary winding being connected to ground. Magnetic amplifiers 100 and 102 each have in addition to their control and power windings, extra windings 236 and 238, respectively. The additional windings 236 and 238 are each wound oppositely to the power and control windings on their respective cores 112 and 118 and are connected on one side to the power pulses PP–1 and PP–2 respectively. The other sides of windings 236 and 238 are connected via diodes 240 and 242, respectively, to line 244 which is further connected to the lower end of the primary winding of transformer 230. Since the windings 236 and 238 are wound oppositely to power windings 114 and 120, respectively, line 244 will be at a high level of potential when line 34 is at its low level of potential or 0 output; and conversely, when line 34 is at its high level of potential or 1 output, line 244 will have a low level of potential. The above mentioned potentials on line 244 serve to enable and disable a flow of current through diode 232. That is, when the level of potential on line 244 is high, diode 232 is thereby biased to nonconduction and vice versa. Therefore, a carry arriving on line 22' will be pulsed through the transformer 230 only when line 244 is at a low level of potential, that is, when line 34 has a 1 output. Clamping circuit 246 comprising diode 248 with its anode grounded and connected to the positive side of battery 250, the negative terminal of which is connected to resistor 252, operates to clamp the bottom end of the primary of transformer 230 at ground potential in the absence of a high level of potential on line 244. The operation of clamping circuit 246 is similar to clamping circuit 156 as described in connection with Figure 3. The resulting operation of gate 24 is the same as for the diode-resistance gate 24 in Figure 3. The high and low level of potential on line 244 may be made to correspond in value to the high and low levels of potential on line 34, and consequently, line 244 may lead to the output 36 to give a positive indication of a 0 output in conjunction with a positive indication from line 34 of a 1 output.

Figure 5:
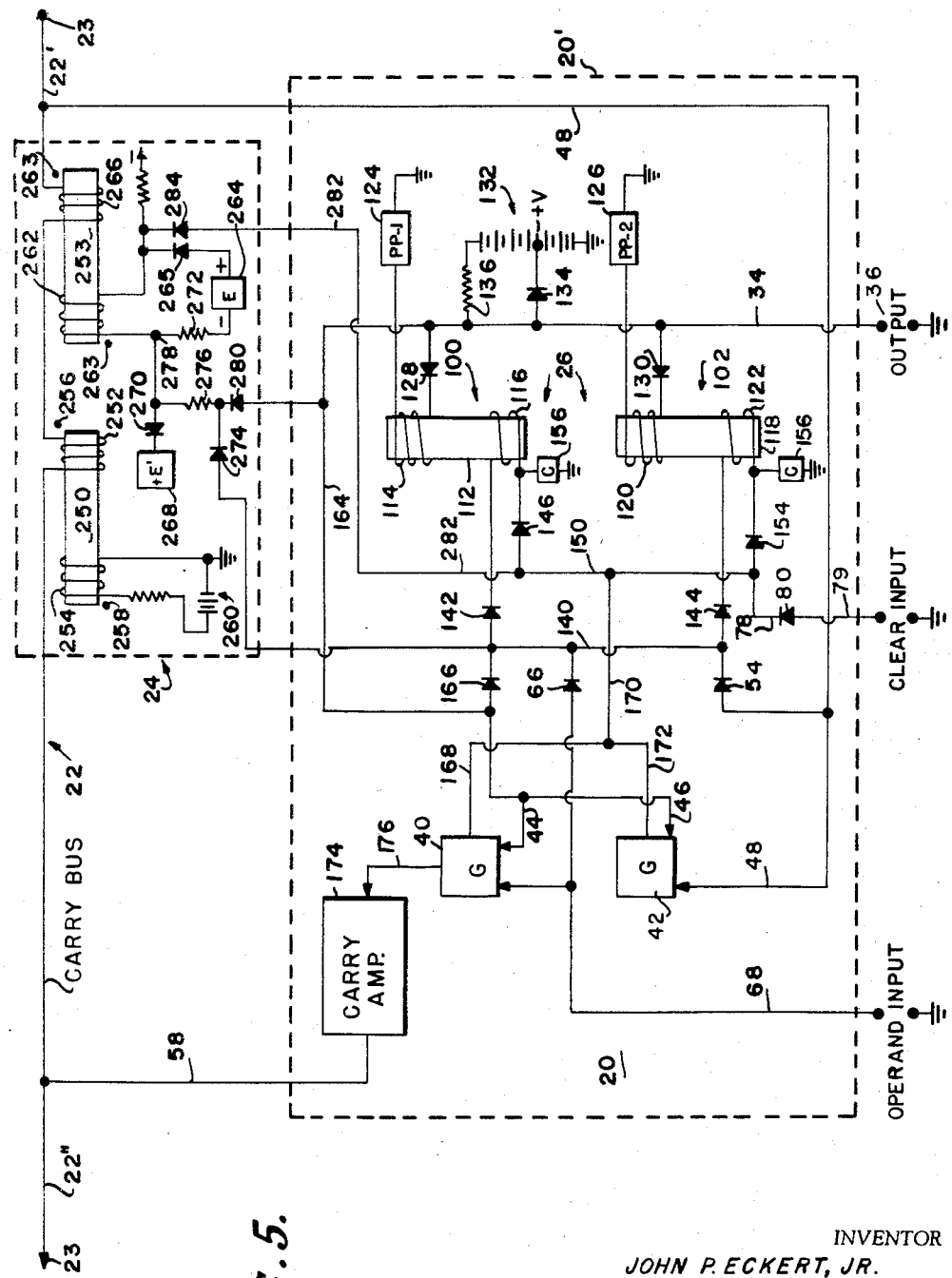
Figure 5 shows another embodiment of an adder unit.

Figure 5 shows another modification of the invention wherein the gate 24 utilizes magnetic core devices which themselves form what may be termed magnetic gates. These gates, designated by reference characters 250 and 253, each consist of cores which have a high ratio of remanent to saturated flux, so that, depending upon the polarity of the remanent flux, a winding on such a core may be made to present either a high or low impedance to a pulse of a given polarity. The core of magnetic gate 250 consists of rectangular loop material with the two windings 252 and 254 having relative instantaneous polarities as shown by dots 256 and 258. A constant current source 260, during the interval between carries on carry bus 22, polarizes the core so that it will cause winding 252 to present a high impedance to positive pulses appearing on its left terminal (as from line 56) and a low impedance to positive pulses appearing on its right terminal (as from line 22'). If a carry is produced by the counting unit 20 in a manner as previously described and issues from carry amplifier 174 to line 56, the core of magnetic gate 250 will be flipped to a reverse remanence state but will be restored to its original state by the constant current source 260 upon cessation of the carry pulse on line 56. A diode (not shown) could be used as an alternative to magnetic gate 250, since the function of the gate is to prevent passage of a carry impulse in the wrong direction, i.e., to less significant digit adder units. Figures 3 and 4 show the use of diodes 110 and 234, respectively, to accomplish this purpose.

Magnetic gate 253 is similar to magnetic gate 250, but it is connected to gate carry pulses from the incoming carry bus line 22' to the outgoing carry bus line 22" in accordance with the logic of addition. Windings 262 and 266 have a winding sense as represented by dots 263. In the absence of any other inputs to the control winding 262, a constant current source 264 applied thereto through diode 265 and resistor 272 sets the core of the magnetic gate 253 so that winding 266 presents a high impedance to an incoming carry pulse from line 22'. A reference voltage from source 268 is applied to the cathode of diode 270 whose plate is connected to the negative end of source 264 through resistor 272. The voltage of source 268 is appreciably greater than that of source 264. Line 140 is connected via diode 274 and resistance 276 to the junction 278 and thereby to one side of control winding 262. Line 164, the feedback line for magnetic amplifiers 100 and 102, is also connected to junction 278 through resistance 276 and another diode 280. Therefore, when line 140 is raised in potential by either an operand input on line 68 or a carry input on line 48 via diode 54, current through winding 262 is reversed since the potential of source 264 is opposed at junction 278 by the higher potential of either line 140 or line 164. The reversal in current in winding 262 changes the normally high impedance of winding 266 as seen by a carry input on line 22' to a low impedance. Therefore, during the time when line 34 has a 1 output, carries arriving on line 22' may pass through magnetic gate 253 on to output section 22". However, when line 150 is raised in potential so that line 34 is reduced to a 0 output, the coupling of line 150 to winding 262 over line 282 via diode 284 permits the remanence state of the core of the magnetic amplifier to be reversed. Thus, a carry on line 22' cannot effectively pass through magnetic gate 253 when line 34 has a 0 output level. The operation of the adder unit is otherwise the same as previously described for the adder unit illustrated in Figure 3, except that the power pulses PP–3 applied to magnetic amplifier 178 within carry amplifier 174 (see Figure 3) may be modified slightly when used in conjunction with the magnetic gates in gate 24 of Figure 5, the modification being that during the negative excursion of the power pulses PP–3, the pulses are caused to be of such amplitude as to assure that output diode 190 (see Figure 3) will be biased off regardless of the voltage which may be induced on the carry bus 22 as a result of flux changes in the cores of magnetic gates 250 and 253 and their homologues. If diode 190 is not biased completely off during the negative excursion of pulses PP–3, false carry signals may appear on carry bus 22".

Figure 6:
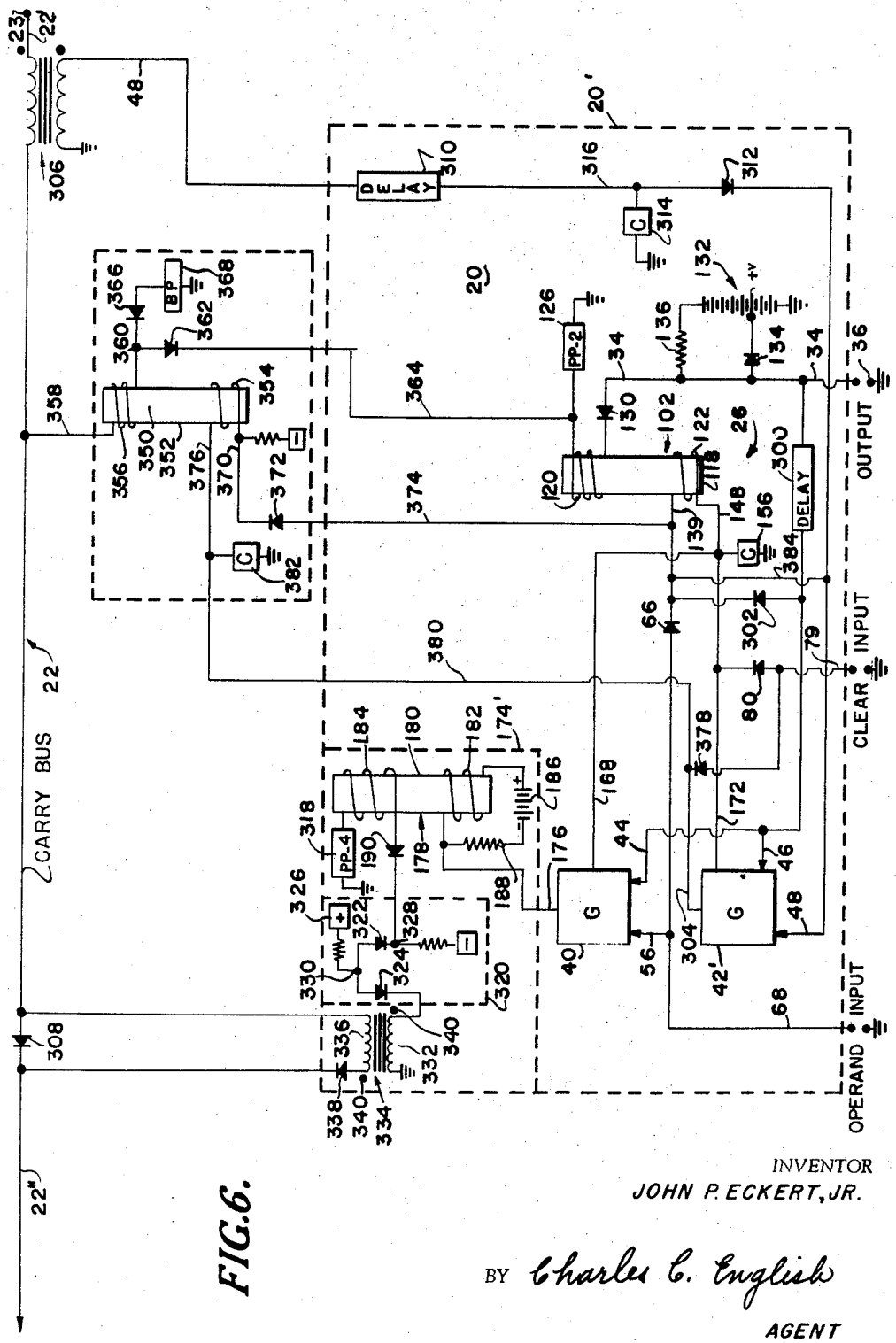
Figure 6 shows still another embodiment of an adder unit.

Figure 6 illustrates another modification wherein a single core magnetic amplifier circuit is used in bistable accumulator 26. For example, magnetic amplifier 102 of Figures 3, 4, and 5 may be utilized in this modification without magnetic amplifier 100. Elements of Figure 6 which correspond to like elements in the prior embodiments are given the same numbers. The power winding 120 of magnetic amplifier 102 is connected to source 126 of power pulses PP–2 and through diode 130 to output line 34 in like manner as previously described for Figure 3. Line 34 also connects to a potential +V of source 132 via diode 134 and to the more positive end of source 132 by resistor 136. As previously explained, line 34 remains at +V potential when the core 118 of magnetic amplifier 102 causes the power winding 120 to present a high impedance to the positive current flowing from resistor 136 during the time that power pulses PP–2 are zero in potential.

Since only one amplifier is used in this embodiment, a delay element 300 is connected between line 34 and the input line 139 of control winding 122 via diode 302. Consequently, the voltage level on line 34 is fed back to the input winding 122 in a time relationship caused by delay element 300 to maintain line 34 at its higher level in the absence of any other inputs to winding 122. The delay element 300 delays the signal applied thereto one half cycle (one power pulse width) of pulses PP–2. Further reference will be made to the timing of the pulses PP–2 in relation to the output of delay element 300 hereinbelow during the discussion of the operation of the adder unit shown in Figure 6 in relation to the waveforms of Figure 6A.

Gates 40 and 42' may comprise the diode resistance type elements as previously described for gates 40 and 42, gate 42' being similar to the previously described gate 42 of Figures 3, 4, and 5, but having an additional output line 304. The output from delay element 300 enables gates 40 and 42' over lines 44 and 46 respectively. The operand input line 68 connects to gate 40 at the other input thereof over line 56 and further connects to the upper input line 139 of control winding 122 via diode 66. The incoming carry bus line 22' is connected to one side of the primary winding of transformer 306 which connects at its other end to the outgoing carry bus line 22" via diode 308. Input carry pulses arriving on line 22' appear in the secondary winding of transformer 306 and are presented to delay element 310 which delays the carry pulse one half cycle (one pulse width) of the power pulses PP-2. The output of delay element 310 is connected to a second input of gate 42' over line 48 via diode 312. Clamping circuit 314 operates in a manner similar to the previously described clamping circuit 156 in reference to Figure 3, and holds line 316 substantially at ground potential in the absence of any carry inputs.

The output from gate 40 on line 176 is presented to the carry amplifier 174' which has a magnetic amplifier 178 operated by a source 318 of power pulses PP-4 and an impedance holding source of potential 186, the latter being connected to control winding 182 via reverting resistor 188 at the negative side thereof and directly to the other end of the winding from the positive side of source 186. In the absence of an input from line 176 to the control winding 182, only a small amount of current will pass through the power winding 184 and diode 190 because the reverting current from source 186 holds the core 180 so that winding 184 presents a high impedance to pulses PP-4. However, when gate 40 provides an output over line 176, a comparatively large pulse issues from diode 190. To provide a more constant current source for a generated carry pulse, a diode resistance gating unit 320 is connected to the cathode end of diode 190. Diode 322 (but not diode 324) is constantly conducting a predetermined amount of current from the constant current source 326, but when there is a carry output from power winding 184 to junction 328, diode 322 is blocked from further conduction. The level of potential at the junction 330 thereupon raises and causes a predetermined amount of current to pass through diode 324 and into the primary winding 332 of transformer 334. The secondary winding 336 then provides a source of voltage for output carry pulses and is connected across diode 308 via diode 338 to the outgoing carry bus line 22". The secondary winding 336 is wound oppositely to the primary winding 332 of the transformer 334 as shown by dots 340 so that a positive pulse passes upwardly through diode 338. The reverse impedance of diode 308 is much greater than the impedance of the circuit which a carry pulse issuing on line 22" may have to follow before being grounded and effectively returned to its source, the secondary winding 336. However, as will be seen, diode 308 may be dispensed with, its main purpose being to present a lower impedance to incoming carry pulses on line 22' which pass through gate 24 than would the secondary winding 336.

In the embodiment of the invention illustrated in Figure 6, the carry control gate 24 may take the form of a magnetic gating element 350 having a core 352 provided with control winding 354 and output winding 356. Windings 354 and 356 are wound in the same direction on the core so that signals of the same polarity imposed upon corresponding input lines of the two windings will have the same effect respecting the remanence of the core 352, and consequently, respecting the impedance of the windings themselves. The upper input line 358 of winding 356 is connected to the carry bus 22 which, inter alia, connects the primary of transformer 306 to the secondary of transformer 336. The other end of winding 356 is connected at junction 360 to the anode of diode 362 whose cathode connects over line 364 to source 126 of power pulses PP-2 and therethrough to ground. Also connected to junction 360 is the cathode of diode 366, whose anode is connected to a source 368 of blocking pulses BP. The other side of source 368 is grounded so that blocking pulse BP may range in potential from ground (or zero) to a negative value sufficient to prevent conduction through diode 366; however, when the blocking pulses BP are at their zero level, the diode 366 allows current to flow from ground through winding 356 (assuming its impedance is sufficiently low), to the secondary winding 336 of transformer 334 via carry bus 22. This then provides the return path for a carry pulse produced in transformer 334.

Control winding 354 of magnetic gate 350 is connected at its lower input line 370 to the upper input line 139 of magnetic amplifier 102 via diode 372 over line 374. The upper input line 376 of control winding 354 is connected by line 380 to the output line 304 of gate 42' and to the clear line 79 via diode 378. Clamping circuit 382 maintains line 376 substantially at ground potential in the absence of any inputs to control winding 374. When there is an input on line 139 either from an operand appearing on line 68, or a carry input on line 22' via diode 312 and line 384, or a feedback via delay element 300 and diode 302, line 374, and consequently, the lower input line 370 of control winding 354, will be raised in potential. When this happens, the core 352 causes winding 356 to present a high impedance to carry pulses arriving on the incoming carry bus line 22'. However, if line 380 is raised in potential by an input on the clear line 79 or by an output from gate 42' over line 304, the input line 376 of control winding 354 will be raised in potential and will change the remanence state of the core 352 so that a low impedance will be presented by winding 356 to carry pulses arriving on incoming carry bus line 22'. In this event, the carry pulse passes through winding 356 and diode 362 to ground through a source 126 of power pulses PP-2 which are so timed with the carry input as to be at zero potential so that source 126 provides negligible impedance for the carry pulse. On the other half cycle of pulses PP-2, their magnitude of +2V volts blocks any possible flow of current through diode 362. Likewise, blocking pulses BP from source 368 are negative when pulses PP-2 are positive and therefore prevent any possible flow of current through diode 366. Consequently, no current can flow in winding 356 during such times (i.e., during the times for all odd numbered columns of the waveforms shown in Figure 6A). Therefore, even though control winding 354 may receive signals on either of its input lines which attempt to cause induced voltages of one polarity or the other in winding 356, no current can flow therein from such signals, and consequently, the possible appearance on bus 22 of false carry signals has been eliminated.

Figure 6A:
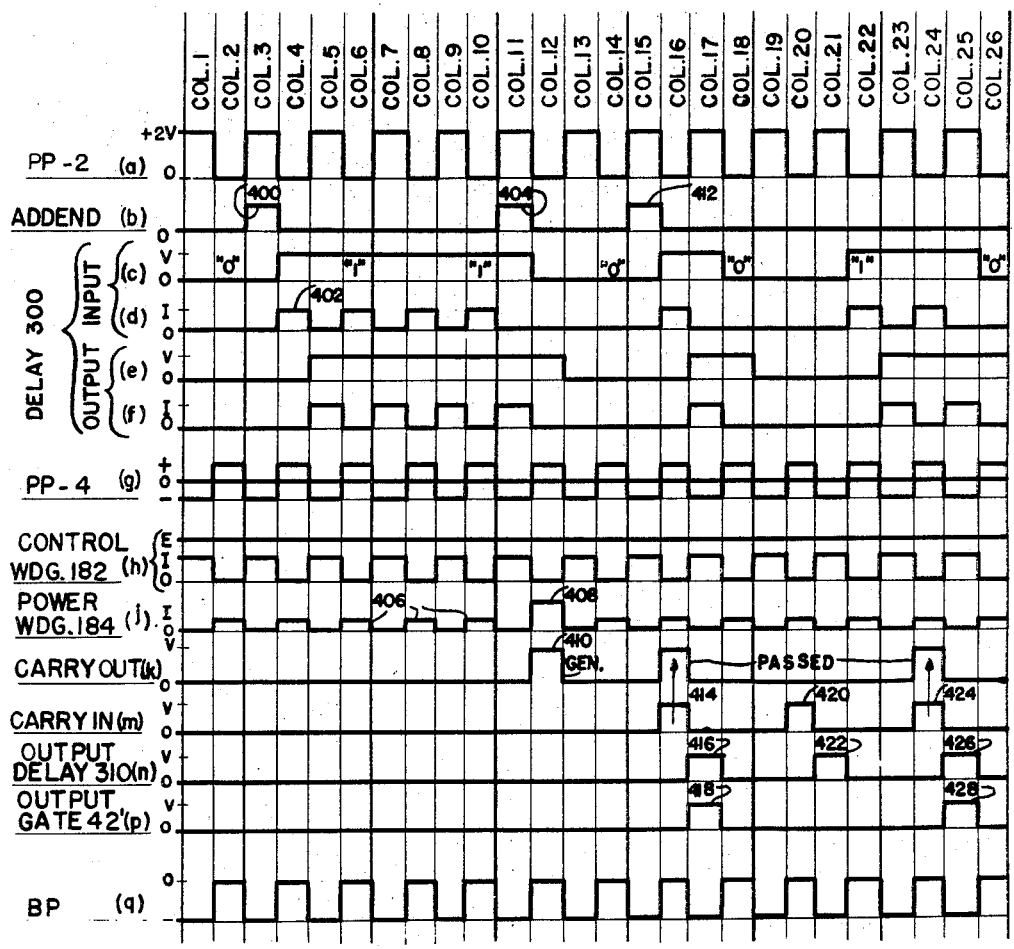
Figure 6A shows a chart of waveforms applicable to the embodiment of Figure 6.

The operation of the apparatus illustrated in Figure 6 will now be further explained with reference to Figure 6A. Assume that line 34 is either at the low level of potential (0 output) or is caused to move thereto by an input on the clear line 79 (the 0 state being represented by the waveforms in column 1 and column 2 of Figure 6A). An addend 1 input on line 68, as represented by pulse 400 (waveform (b) of Figure 6A), will have the following effect: input line 139 of control winding 122 will raise in potential and prevent power winding 120 from passing large currents so that line 34, and consequently the input to delay element 300, will move to a high level of potential during the time when power pulses PP-2 are at zero potential, as shown by waveform (c), at column 4 in Figure 6A. The pulse of current produced on line 34 and delivered to delay element 300 is shown in waveform (d) by reference numeral 402. As previously mentioned, delay element 300 provides a half cycle (one pulse width) delay so that during the following positive excursion of pulses PP-2 (column 5), the voltage and current output from delay element 300 appears as is shown by waveforms (*e*) and (*f*) of Figure 6A. The feedback of the current pulses from delay element 300 through diode 302 to line 139 maintains core 118 in such a remanence state that winding 120 presents a high impedance to each negative-going excursion of pulses PP-2. Consequently, the potential on line 34 will remain at the 1 level in the absence of other inputs to control winding 122. This condition is represented by the waveforms (*c*) and (*d*) in columns 7 through 10 of of Figure 6A. However, if another addend 1 input, as represented by pulse 404, arrives on operand input line 68, gate 40 previously enabled by the high level of potential from delay element 300 over line 44, will have an output on line 168 to the lower input line 148 of control winding 122. At the same time, the 1 input on line 68 passes through diode 66 to the upper input line 139 of control winding 122 to oppose the effect of an input on line 148. Consequently, during the next negative-going power pulses PP-2 (column 12), line 34 and the input to delay element 300 (waveform (*c*) of Figure 6A) will move to the lower level of potential to provide a 0 output. During the following positive excursion of power pulses PP-2 (column 13), the output of delay element 300 will fall to zero (see waveforms (*e*) and (*f*) of Figure 6A for voltage and current outputs respectively). Thus, the addition of 1+1 has produced a 0 in the output, and according to the logic of addition (line *b* of Table A) an outgoing carry pulse must be produced. This is accomplished as follows: power pulses PP-4 vary positively and negatively of 0 volts, and their negative excursion is timed to occur with the positive excursion of power pulses PP-2 (compare waveforms (*g*) and (*a*) of Figure 6A). Consequently, the constant voltage of source 186 connected to control winding 182 of magnetic amplifier 178 will cause current to flow through winding 182 when a positive-going PP-4 pulse changes the state of the core to a remanence such that during the following negative-going PP-4 pulse, current may flow through control winding 182. This is shown in the first ten columns of waveform (*h*) in Figure 6A. When the addend 1 pulse 404 appeared, gate 40 gave an output not only on line 168 but also on line 176 which opposed the flow of current from source 186. Therefore, during the next positive excursion of pulse PP-4 (column 12), power winding 184 allowed a larger than normal output current through diode 190. Waveform (*j*) of Figure 6A shows the normal output current pulses 406 from power winding 184, while the carry output current pulse produced therefrom is represented by pulse 408. Pulse 410 in waveform (*k*) represents the voltage produced in the secondary of transformer 334 by the current pulse 408, and consequently, the output pulse which appears on line 22''. Blocking pulses BP (waveform (*q*) of Figure 6A) in source 368 are timed, as previously mentioned, to be zero volts during the time when power pulses PP-2 are zero and when power pulses PP-4 are in their positive excursions. Therefore, the carry out pulse 410, being generated when blocking pulses BP are at 0, may be returned from a more significant adder unit to ground and through BP source 368, diode 366, power winding 356, and carry bus 22 to its source, transformer 334. Since line 380 was not raised in potential by an output from gate 42' on line 304, the upper input line 376 of control winding 354 was not raised in potential. The raising of line 374 by the addend 1 input pulse 404 caused the remanence of core 352 to remain in a state such that the impedance of winding 356 to inputs from line 358 remained high, and the impedance to currents in the opposite direction remained low; i.e., the impedance to the return of a generated carry pulse through ground and blocking pulse source 368 and through winding 356 to line 358 on to the carry bus 22 was low. Thus, a complete path has been provided for a carry pulse generated by the addition of 1+1.

Assume now that another addend 1 input pulse 412 (waveform (*b*) of Figure 6A) arrives during the time represented by column 15. The input to delay element 300 then moves to a 1 level of potential during the following pulse width (waveform (*c*), column 16) as does the output of delay element 300 (waveform (*e*), column 17). The addend pulse 412 serves to hold core 352 in a remanence state such that the carry pulse 414 of waveform (*m*) arriving on the incoming carry bus line 22' meets a high impedance in winding 356. Therefore, the incoming carry pulse 414 is passed directly along carry bus 22 to the outgoing line 22''. At the same time the incoming carry pulse on line 22' passes through transformer 306 and is presented to delay element 310. As previously mentioned, delay element 310 delays the carry pulse one half cycle (one pulse width) of PP-2 pulses, the output pulse thereof being represented by reference character 416 in waveform (*n*) of Figure 6A. Pulse 416 is presented to gate 42' which at this time is enabled by the output of delay element 300 over line 46. Therefore, the output from gate 42' over line 172 to the lower input line 148 of control winding 122 causes a lowering of the impedance of power winding 120 so that line 34 is reduced to its 0 output level, as shown in waveform (*f*), column 18 of Figure 6A. When gate 42' passed the output pulse 418 of waveform (*p*) over line 304, line 380, and consequently line 376, raised in potential and reverted the state of core 352 so that inputs on line 358 to winding 356 meet a low impedance. Therefore, assuming no addend pulse arrives during the time of column 19 in Figure 6A, but that a carry pulse 420 arrives on incoming carry bus line 22' during the time period of column 20, the carry pulse 420 will pass through winding 356, diode 362, and source 126 of power pulses PP-2 to ground, the level of potential of power pulses PP-2 being zero at this time. Therefore, no carry will be propagated out over line 22''. During the following positive excursion of power pulses PP-2, delay element 310 will produce the delayed output pulse 422 of waveform (*n*) from the incoming carry pulse 420. The output of delay element 310 is unable to pass through disabled gate 42' but it raises the potential of the upper input line 139 of control winding 122 by passing thereto over line 384. Therefore, line 34 and the input to delay element 300, waveform (*c*), will move to a higher level of potential to provide a 1 output as shown in column 22.

If the 1 state of line 34 is assumed to remain, and another carry input on line 22' arrives, this carry input pulse 424 will pass to the outgoing carry bus line 22'' since the 1 state of line 34 was fed back through delay element 300, diode 302, line 139, and line 374 to the lower input line 370 of control winding 354 and raised the impedance of winding 356 to positive currents coming in on line 358. During the following positive excursion (column 25) of pulses PP-2, delay element 310 provides the delayed output pulse 426 of waveform (*n*) from the incoming carry pulse 424. Pulse 426 passes over lines 316 and 384 to the upper input line 139 of control winding 122; however, the delayed carry pulse 426 also passes from line 316 over line 48 to an input of gate 42' which is at this time enabled by an output from delay element 300, waveform (*e*), over line 46. Therefore, gate 42' will provide the output pulse 428 of waveform (*p*) over line 172 to the lower input line 148 of control winding 122; therefore, the simultaneous inputs on lines 139 and 148 of control winding 122 will prevent current from passing through winding 122 so that during the following negative-going excursion of power pulses PP-2 (column 26), line 34 and the input to delay element 300 (waveform (*c*) of Figure 6A) will move to 0.

The circuitry as shown in Figure 6 has therefore provided total summations and carry pulses in accordance with the logic of binary addition as shown in Table A.

As may be seen by reference to Figure 6A, only 50% of the duty cycle of pulses PP-2 is utilized, and consequently, four pulse widths or two cycles of pulses PP-2 are required for a complete addition assuming the augend is already stored within the adder unit. The first pulse width (e.g., columns 3, 7, 11, 15, 19, 23) is reserved for reading in the addends of waveform (b) and setting magnetic gate 350 appropriately; the second pulse width (e.g., column 4, etc.) is reserved for the generation of carries (waveform (k), column 13, etc.) and/or the arrival of incoming carries (waveform (m), column 16, etc.); the third pulse width provides the delayed incoming carry pulses from delay element 310, waveform (n); and the fourth pulse width (e.g., columns 6, 10, 14, etc.) provides time for read out. Therefore, two pulse widths intervene between the reading in of the addend and the reading out of the total summation.

The circuitry as shown in Figure 6 is so timed that the operation may be divided into three classifications: (1) When magnetic amplifier 102 is about to step to 0 output on line 34 and generate a carry pulse from gate 40, magnetic gate 350 will permit the next input carry on line 22′ to pass directly along carry bus 22 to the outgoing line 22″ and the winding 356 of magnetic gate 350 will present a low impedance to the return of a generated carry to the secondary winding 336 of transformer 334. This condition is exemplified by the waveforms in columns 11 through 14. (2) When magnetic amplifier 102 gives or is about to give a 1 output on line 34, magnetic gate 350 will permit the next period's carry arriving on line 22′ to pass directly to line 22″. Columns 15 through 18 and 23 through 26 illustrate the waveforms for this condition. (3) When magnetic amplifier 102 provides or is about to provide a 0 output on line 34 without emitting a carry pulse on line 176 from gate 40 (i.e., a carry pulse arrives on line 384 or a clearing pulse is impressed on line 79), magnetic gate 350 will not permit the next input carry from line 22′ to pass to line 22″ but grounds it through diode 362. This condition is exemplified by the waveforms in columns 19 through 22.

A modification of the magnetic gate 350 of Figure 6 is shown in Figure 7 wherein there is illustrated a controllable transformer 401 having a winding 403 wound in the same direction as control winding 354 and winding 356. (Elements of Figure 7 corresponding to like elements of Figure 6 are similarly numbered.) Blocking pulse source 368 and diode 366 remain connected to winding 356 in the same manner as they were in Figure 6. However, line 364 and diode 362 are connected to the additional winding 403, the other end of which forms a part of carry bus 22 and leads to the outgoing carry bus line 22″ through diode 308 or transformer 334 as in Figure 6. In Figure 7 no change has been made in the connections to control winding 354. Therefore, the operation of the magnetic gate 401 will be the same as magnetic gate 350 of Figure 6. Further explanation of the operation of magnetic gate 401 is not thought to be necessary in view of the explanation of the operation of magnetic gate 350 (Fig. 6), the use of two windings wound in the same direction on a magnetic core being well known in the magnetic amplifier art.

Figure 8:
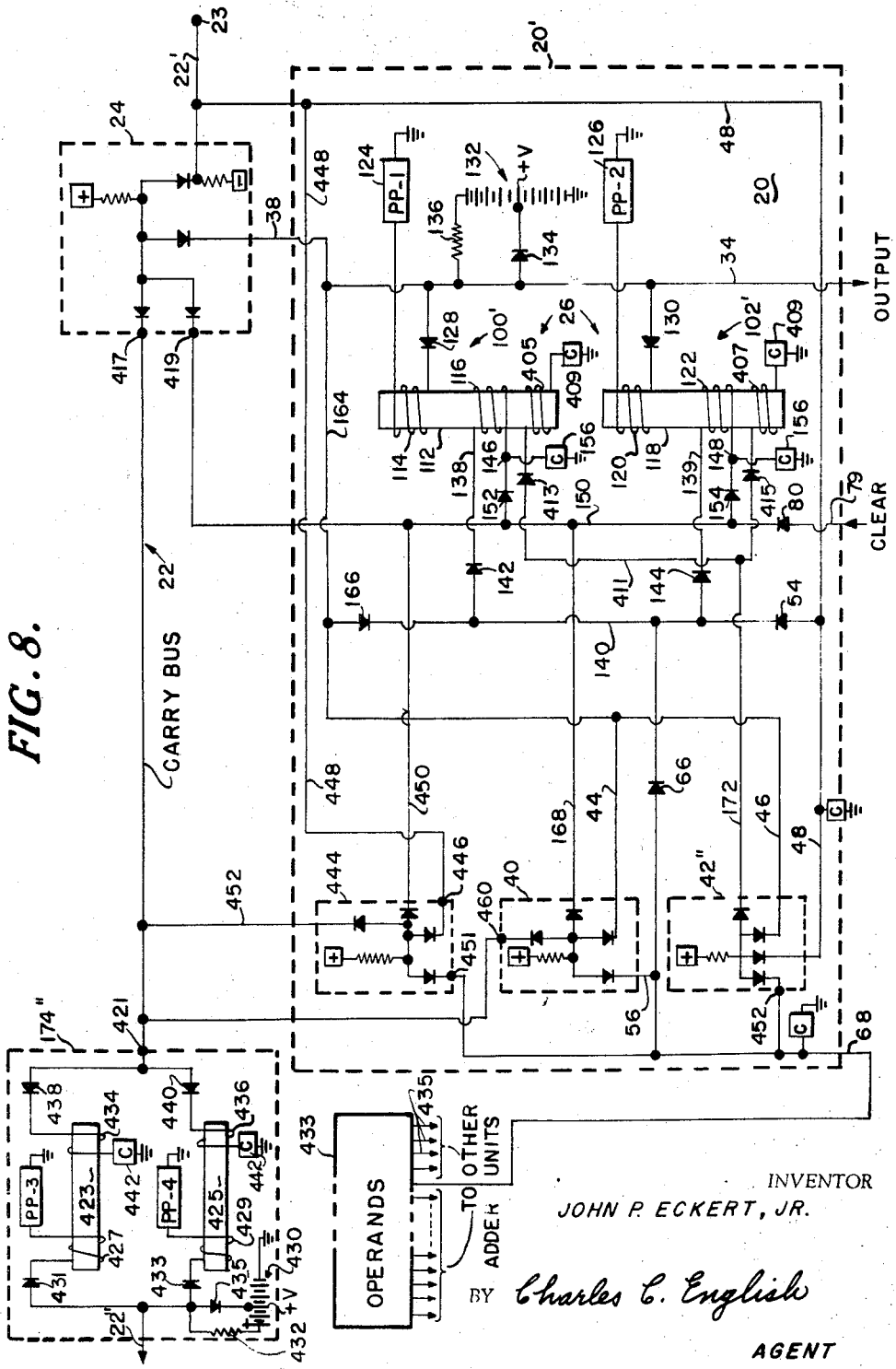
Figure 8 shows a further embodiment of an adder unit diagrammatically connected into a parallel adder system.

Another embodiment of the invention is shown in Figure 8. This embodiment comprises an adder unit for use in a parallel system of similar adder units for adding a number of addends with a reduced total time for carry transfer from one adder unit to a next more significant adder unit even though the conventional digit-to-digit method of carry propagation be used in the adder system. The full-wave adder unit of Figure 8 is capable of adding simultaneously an addend and a carry input to the content of its bistable accumulator and can operate at a rate equal to twice the frequency of the power pulse sources. That is, with reference to Figure 8A, the addend inputs of waveform (c) appear during each pulse width of the power pulses PP-1, waveform (a). Means to supply the different successive addend inputs during each pulse width to a plurality of adder units in a system is illustrated diagrammatically in Figure 8 as operand generating means 433. It should be understood that the "other add units" there referred to may be connected in parallel along with the adder unit shown in full in a manner similar to that illustrated in Figures 2 and 2A to form a complete adder system of, say, N units, but that each of the N units is fed individually by generator 433 over its respective output lines 435 to the units' operand input lines.

The adder unit of Figure 8 is capable of generating its carries only one pulse width after the input allowing a carry generation. If two immediately successive inputs (operands and/or carries) allow carries in accordance with the logic of binary addition, two immediately successive carries will be generated, the first being generated simultaneously with the receipt of the second input. Since the unit is capable of receiving carries and addends simultaneously, it is not necessary to delay addend inputs until carries caused by a preceding addend input have been fully propagated. Therefore, as previously mentioned, addends may be received from the operand generating means 433 at twice the frequency of either power pulses PP-1 or PP-2, and only after the introduction of the last addend to be added, will it be necessary to wait for N/2 power pulse cycles to assure complete propagation and addition of carries, where N is the total number of adder units in the complete adder system.

Referring to Figure 8 in detail, magnetic amplifiers 100′ and 102′ are similar to the amplifier circuits 100 and 102 described for previous embodiments in that each have a power or output winding 114 and 120, respectively, winding 114 being pulsed by a source 124 of pulses PP-1 180 degrees out of phase with pulses PP-2 from source 126 which is connected to winding 120. Each magnetic amplifier 100′ and 102′ not only has, as in previous embodiments, a control winding 116 and 122 respectively (the connections thereto being similar to the connections shown in Figures 3, 4, and 5) but also a second control winding 405 and 407. These latter two windings are each connected at one end to ground through clamping circuits 409. Their other ends are coupled together by line 411 via input diodes 413 and 415 respectively. Line 411 is further connected to the output of gate 42″ by line 172. The operation of magnetic amplifiers 100′ and 102′ is the same as described for the operation of amplifiers 100 and 102 of the prior described embodiments except that an input to line 150 cannot offset an input to the new control windings 405 and 407. As will become apparent, an output on line 172 from gate 42″ to line 411 always operates to prevent a shift of the state of the accumulator 26 and thereby maintains line 34 in a 1 state when an addend and a carry received simultaneously are to be added to a 1.

The incoming carry bus line 22′ is connected to gate 24 which may be of the diode resistance type as illustrated, but which has two output terminals 417 and 419. Output terminal 417 connects to a carry pulse generator and amplifier 174″ over a part of carry bus 22. Carry amplifier 174″ will generate a carry pulse onto the outgoing carry bus line 22″ when a signal arrives at its input terminal 421.

The make-up and operation of carry generator and amplifier 174″ is similar to that of the carry amplifiers 174 previously described; however, two magnetic amplifiers 423 and 425 are connected in parallel with their power windings 427 and 429, respectively, being alternately pulsed by power pulses PP-3 and PP-4, respectively, so that the carry signals at the input terminal 421 can be propagated to more significant adder units at the same speed as the addend inputs arrive on line 68. Power pulses PP-3 are synchronized with power pulses PP-1 (waveform (a) of Figure 8A) and power pulses PP-4 are in phase with power pulses PP-2, waveform (b). The output of power windings 427 and 429 are connected together via diodes 431 and 433 respectively, and through diode 435 to a tap +V of a source of potential 430, the more positive end of which is connected through resistor 432 to the anode of diode 435. Control windings 434 and 436 receive signals from the input terminal 421 via diodes 438 and 440, respectively, and are clamped at their other end to ground potential, in the absence of signals at input terminal 421, by clamping circuits 442, respectively. The operation of magnetic amplifiers 423 and 425 is similar to the operation of amplifiers 100 and 102 previously explained except there is no need for a feedback circuit as line 164 of Figure 3.

The incoming carry bus line 22' in Figure 8 is also connected to an input terminal 446 of gate 444 by line 448. The addend input line 68 is connected to gate 444 also but at its other input terminal 451. Therefore, when there appears an incoming carry on line 22' and a 1 addend simultaneously, gate 444 supplies an output over line 452 to the input terminal 421 of carry generator 174''. Gate 444, as illustrated, may be of the diode resistance type gate with two input diodes and two output diodes.

Continuing to refer to Figure 8, gate 40 operates in exactly the same manner as gate 40 in the prior described embodiments and its output line 168 connects to line 150 and thereby to the lower input lines 146 and 148 of control windings 116 and 118, respectively. The output line from terminal 419 of gate 24 along with the second output line 450 from gate 444 also connect to line 150, and therefore, to the lower input lines 146 and 148 of control windings 116 and 122 respectively. Gate 42'' is slightly different from gate 42 of Figures 3, 4, and 5, and gate 42' of Figure 6 in that gate 42'' has an extra input at terminal 452 connected to the addend input line 68. The single output from gate 42'' appears over line 172 and connects, as previously mentioned, to the upper end of the new control windings 405 and 407. Gates 24 and 40 are enabled and gate 42'' partially enabled by a 1 output on line 34 by its feedback connection via line 164 to lines 38, 44, and 46 respectively. When gate 42'' is partially enabled thereby, a simultaneous carry input on line 22' via line 48 and an addend 1 input on line 68 produces an output from gate 42'' on line 172.

With reference to Figure 8A, the operation of the adder unit of Figure 8 is as follows: assuming the initial output on line 34 is 0 as shown in Figure 8A, waveform (e), the simultaneous arrival of an addend 1 input pulse 470 on line 68 and a carry input pulse 472 on line 22' (waveforms (c) and (d), column 2 of Figure 8A) causes gate 444 to produce an output on line 452 to the carry generator 174'' whereby an outgoing carry pulse 474 is passed to line 22'' during the following pulse width time (waveform (f), column 3). Since gates 24, 40, and 42'' are disabled by the 0 output on line 34 during the arrival time of the addend and carry inputs of column 2, no outputs will issue from any of these gates. The incoming carry pulse 472 on line 22' passed over line 48 through diode 54 to the upper input lines 138 and 139 of control windings 116 and 122 respectively; however, at the same time gate 444 provides an output to line 450 which is coupled to the lower input lines 146 and 148 of control windings 116 and 122, so that the effect of the raise in potential of input lines 138 and 139 is opposed by the raise in lines 146 and 148. Consequently, no current flows through control windings 116 and 122, and a shift of the accumulator 26 is thereby inhibited so that line 34 may remain at 0 to indicate the sum of 0 plus a simultaneous 1 and carry input.

It may be noted here that the adder unit of Figure 8 is particularly useful when it is unnecessary to read out the intermediate totals, i.e., when only the final summation of a group of addends and their carries is desired. Therefore, no provision is made for a read out time until all the addends have been fed to line 68.

Proceeding further with the operation of Figure 8 in conjunction with the waveforms shown in Figure 8A, it is assumed that during the time interval for column 3 of Figure 8A, that another addend 1 pulse 476 is received while the carry out pulse 474 is generated, amplified and passed to line 22'. The addend 1 pulse 476 cannot pass through gate 444 since this gate is at this time not enabled by an incoming carry pulse at input terminal 446, nor can the addend 1 pulse 476 pass through gates 40 and 42'' since neither gate is at this time enabled over lines 44 and 46, respectively, the feedback from line 34 being at a low level of potential (see waveform (e), column 3 of Figure 8A); but the addend 1 pulse 476 may pass through diode 66 to line 140 and thereby to the upper input lines 138 and 139 of control windings 116 and 122 respectively. Therefore, line 34 may move to its 1 level during the next zero value of power pulses as shown in waveform (e). With this condition prevailing, it is assumed for column 4 that another carry pulse 478 arrives on line 22' simultaneously with an addend 1 pulse 480 on line 68. Gate 444 will, therefore, issue an output on line 452 to the input terminal 421 of carry amplifier 174''; gates 24 and 40, both enabled by the 1 output on line 34 over lines 38 and 44, respectively, each issue a pulse from output terminals 417 and 460, respectively, to the input terminal 421 of carry amplifier 174'' also; however, the three simultaneous inputs to carry generator 174'' will not have an additive effect on the cores of magnetic amplifiers 416 and 418, since the current in each of the control windings 434 and 436 is limited by clamping circuits 442 respectively. Therefore, only one carry pulse 482 of amplitude +V will be generated and passed to the outgoing carry bus line 22'' and this during the following pulse width (column 5, waveform (f) of Figure 8A).

Upon receipt of the simultaneous addend 1 pulse 480 and carry pulse 478, gate 444 also issued an output on line 450 to the lower input lines 146 and 148 of control windings 116 and 122; however, line 140, and consequently the upper input lines 138 and 139 of control windings 116 and 122, were raised in potential by either the addend 1 pulse 480 passing through diode 66 or the carry pulse 478 on line 48 passing through diode 54. These inputs on lines 138 and 139 are not additive since, as previously explained, the current in control windings 116 and 122 is limited by clamping circuits 156 respectively. The simultaneous raising of potential at each input of control winding 116 and at each input of control winding 122 would, of itself, change the state of amplifiers 100' or 102', but the output on line 172 from gate 42'' to line 414 and thence to the second set of control windings 405 and 407 resets the cores 112 or 118 so that the potential of line 34 (waveform (e), column 4 of Figure 8A) remains at its 1 level.

Assuming this state to prevail at the beginning of the time period represented by column 5 of Figure 8A and assuming further that no addend pulse arrives but that a carry input pulse 484 appears on line 22' during this period, no output will issue from gates 40, 42'', or 444. However, gate 24 being enabled by the high level of potential on lines 34 and 38, will provide a pulse at output terminal 417 for the input terminal 421 of carry generator 174''. Therefore, carry output pulse 480 will be produced during the following pulse width (column 6). Besides the pulse issuing from output terminal 417 of gate 24 during the time period of column 5, a pulse will also issue from output terminal 419 to raise line 150, and consequently, to raise the lower input lines 146 and 148 of control windings 116 and 122, respectively. Therefore, after the time interval of column 5 of Figure 8, line 34 will move to its lower level of potential representative of a 0 output and this even though carry input pulse 484, passed over line 48 and raised line 149 via diode 54. It will be appreciated by those skilled in the art that further additions of addends and carries whether simultaneous or not, will cause the apparatus illustrated in Figure 8 to operate in like manner and that a multitude of further additions can be made at an exceedingly high rate of speed if only the final total summation is desired, as is usually the case in binary multiplication, for example.

Thus, it is apparent that by apparatus as illustrated in Figure 8, successive addend inputs may be added simultaneously with carry inputs during one pulse width (e.g., column 2 of Figure 8A) with only one additional pulse width being necessary to allow for generation and propagation of carries onto the carry bus and into an adjacent and similar more significant digit adder unit as has been explained. This system operates in accordance with the logic of binary addition shown in Table A; however, the initial summations of augend and addend or the intermediate total summations of individual sets of augends, addends and carries are not made available. The system allows successive additions at highly accelerated speeds since addends may be received during each pulse width of power pulses PP–1, the system being capable of handling the addends that rapidly even though carries from preceding or less significant digit units are in the course of propagation through the adder system at the same time. When all the several addends have been added, a sufficient time is allowed for propagation of a carry from the least to the most significant adder unit, sufficient time being the time corresponding to one half the frequency of power pulses (e.g., of PP–1) times the total number of adder units in the system. This additional time, in accordance with this invention, needs to be allowed only once for a whole successive group of addends and additions thereof instead of the usual required allotment of the same amount of time for each individual addend addition.

Figure 9:
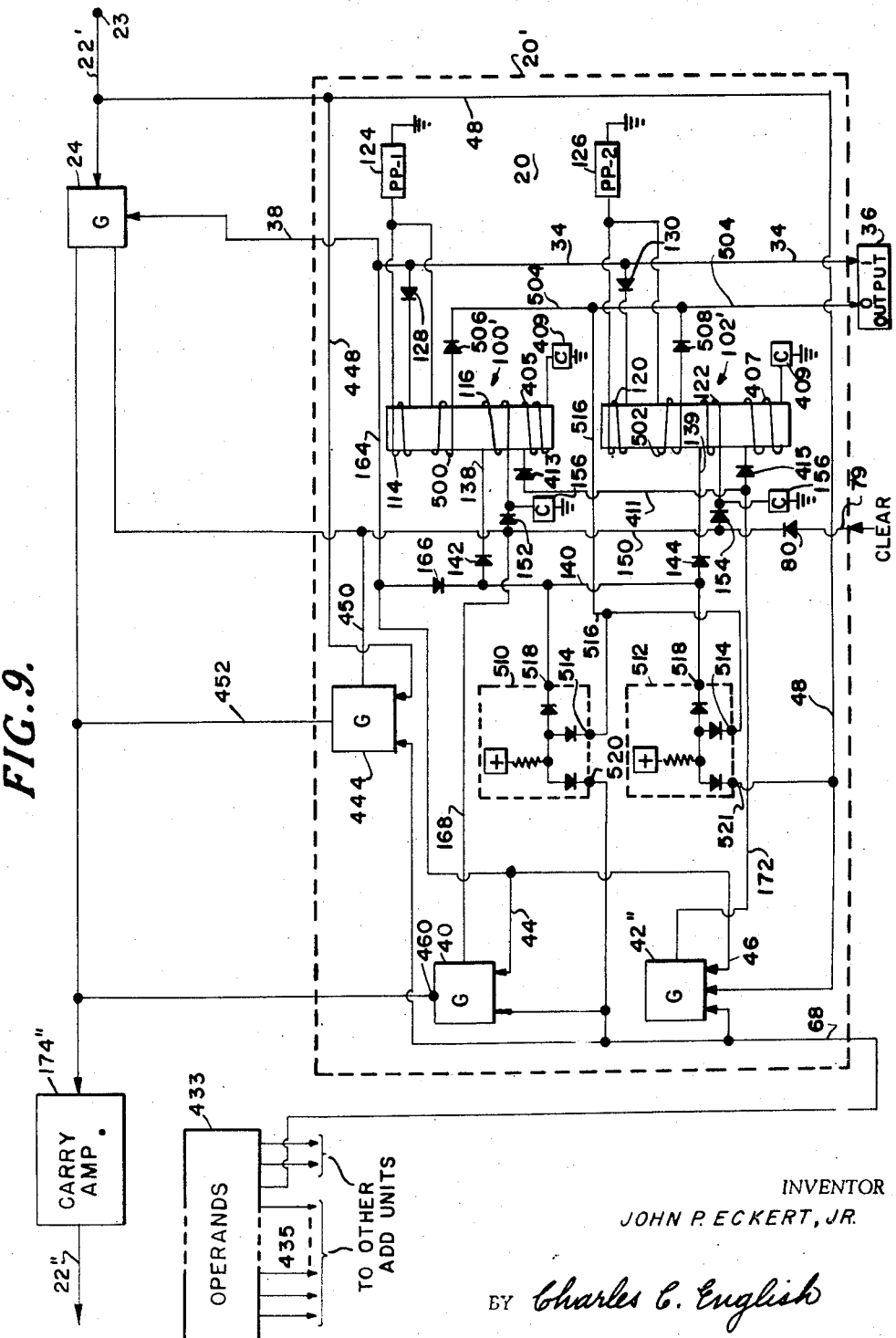
Figure 9 shows a further embodiment of an adder unit diagrammatically connected into a parallel adder system.

Figure 9 illustrates a modification of the invention, and particularly, a modification of the adder system illustrated in Figure 8. All corresponding parts have been retained and are numbered alike, their function and operation being the same as previously described. The magnetic amplifiers 100' and 102' of Figure 9 are similar to those of Figure 8 but have additional power windings 500 and 502 which are wound in opposition to power windings 114 and 120 on the cores of their respective amplifiers 100' and 102'. Corresponding ends of windings 114 and 500 are connected to a source 124 of power pulses PP–1, and in like manner, windings 120 and 502 are connected to a source 126 of power pulses PP–2, the other end of windings 500 and 502 being connected together by line 504 via output diodes 506 and 508. Since windings 500 and 502 are wound oppositely of windings 114 and 120, line 504 will be at a high level of potential when line 34 is at a low level of potential; conversely, line 504 will be at a low level of potential when line 34 is at a high level of potential.

In addition, the embodiment illustrated in Figure 9 provides for gating means 510 and 512 which may be of the diode resistance type as shown and previously described in operation. Each gate 510 and 512 has two inputs and one output, the input terminal 514 of each gate being connected by line 516 to line 504 for receipt of a high level enabling voltage when available on line 504. The output terminal 518 of each gate 510 and 512 is connected to line 140 and further to the upper input lines 138 and 139 of control windings 116 and 122. The other input terminal 520 of gate 510 is connected to the addend input line 68, while the second input terminal 521 of gate 512 is connected to the carry input line 48. The additional gates 510 and 512 operate to prevent a change of the remanence state of the cores of magnetic amplifiers 100' and 102' when line 504 has a low level of potential.

The time duration of one-half of each power pulse cycle, or column, of Figure 8A can be designated as time period $t$. The operation of operand generating means 433 (Figures 8 and 9) is to be such that it is capable of applying over lines 435 an operand pulse simultaneously to each adder unit during every successive period $t$. (Whether an operand pulse will appear on every line 435 in every period $t$ will depend upon the particular addend in each period $t$.)

The connections other than those mentioned above for Figure 9 are the same as in Figure 8 and the operation thereof is the same. Since line 504 has a positive indication of a 0 output, it may be extended to the output 36 to provide a high level 0 output in the same manner as described for Figure 4.

It should be understood that the apparatus illustrated in Figure 9 combines several modification, i.e., gates 510 and 512 may be eliminated with the connections from the addend and carry input lines going through diodes 66 and 54, respectively, as in Figure 8, but with windings 500 and 502 being retained to provide a positive 0 output over line 504; or the gates 510 and 512 may be retained with their enabling lead 516 tied to windings 500 and 502 but with the elimination of the extension of line 504 to the output 36. Other modifications concerning control and/or power windings and inputs thereto may be made and will be apparent to those skilled in the art in view of the embodiments herein described.

Figure 10:
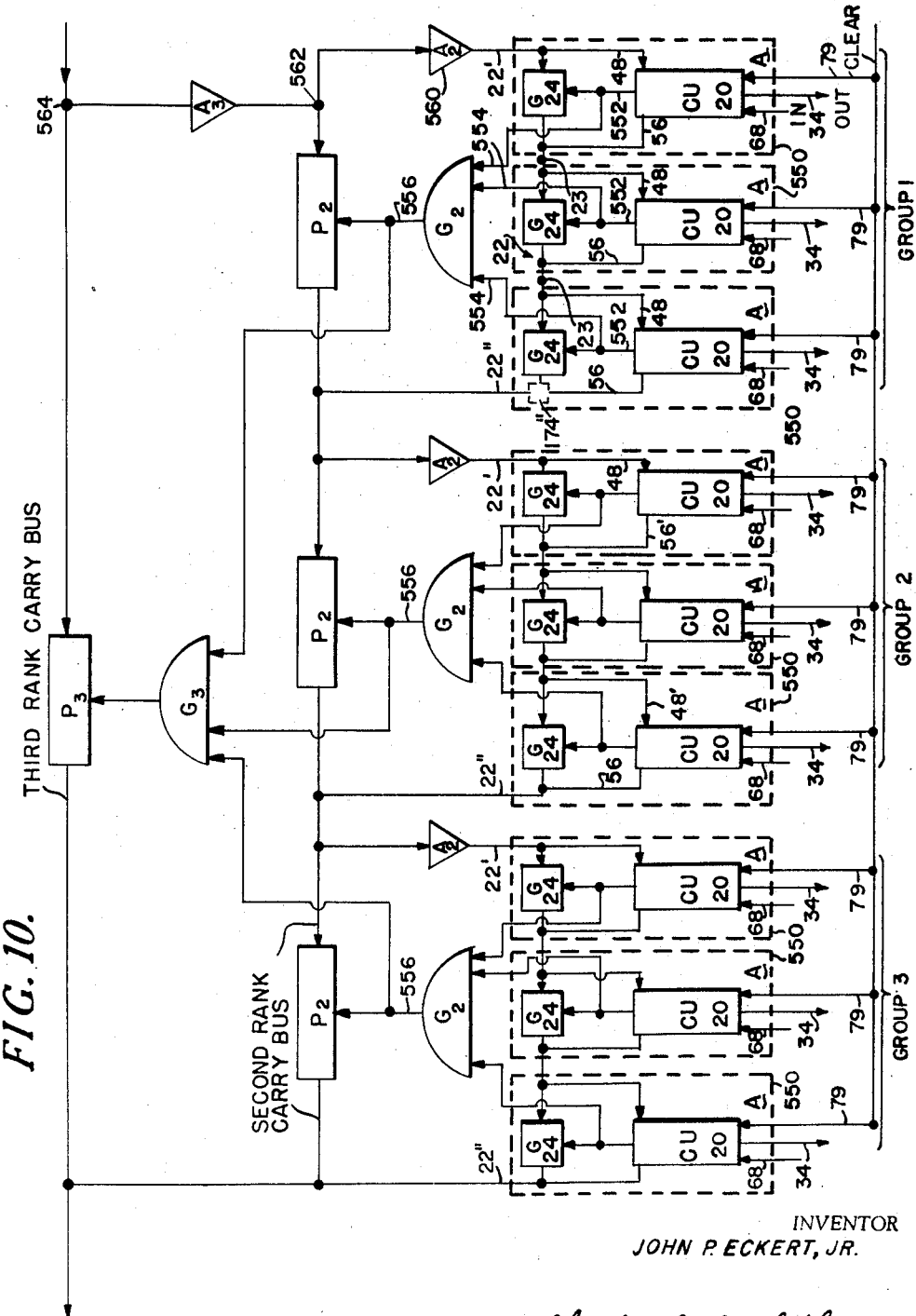
Figure 10 shows a plurality of parallel adder units having carry pulse circuits thereof organized in a system of hierarchies or ranks.

Figure 10 illustrates the connection of adder units, which may be in accordance with the invention as shown in Figures 1 through 9, into "hierarchies" or "ranks." The connection into hierarchies has two advantages: (1) by paralleling or subdividing carry paths, it permits reduction of such delays as occur in propagation over such paths, and (2) by a logical extension of this principle, it permits the insertion of amplifiers, which may produce delay, with a minimal deleterious effect. This latter advantage permits combination of arrays or adder units for such a large number of digits that it would not be feasible to step the carry inputs of all the units from the output of a single carry amplifier.

The counting units 20 are represented by rectangles (CU) and each has inputs for clear, operand and carry pulses, with outputs for carry pulses and read-out signals. The adder units as shown are designated A and enclosed within dash lines 550. Leads 552 represent the necessary enabling connections from counting units 20 to their respective carry bus gates 24. These gates may be of the type shown for gate 24 in Figure 3 or any of the other carry bus gates illustrated in Figures 4, 5, 6, 7, 8, and 9, so that when lead 34 of a counting unit 20 has a 1 output, a carry presented to its gate 24 and to that counting unit will not only be added in the unit but will pass through gate 24 of that adder unit to the output carry bus section 22''. As for the utilization of the adder units illustrated in Figures 8 and 9, it should be understood that at the junction of any of the carry output lines 56 in Figure 10, and the output lines of control gates $P_1$, there may be located a carry amplifier 174'' as shown, for example, connected to the third from the right gate 24.

The several gates $G_2$ and gate $G_3$ are coincidence gates preferably of the diode resistance type but may be any other type having more than one input and which require signals on all of the inputs to provide an output. The diode resistance type gate has been previously illustrated; for example, gate 24 of Figure 3 with it being understood that as many normally conducting diodes may be added as necessary to serve the input requirements. Permit gates $P_2$ and permit gate $P_3$ may be of the same type as carry bus gates 24.

In the specific illustration of Figure 10, the three adder units A on the right are denominated group 1 with the successive sets of three adder units A to the left being groups 2 and 3 respectively. For each group there is one coincidence gate $G_2$ and one carry bus gate $P_2$. The gates $G_2$ connect at their inputs respectively to the enabling leads 552 of each counting unit CU in the group via lines 554, and the output lines 556 of gates $G_2$ are the input lines respectively for gates $P_2$. The output line 556 of each gate $G_2$ is also connected to a different input of gate $G_3$, which, when completely enabled by an output from each of gates $G_2$, enables gate $P_3$.

It should be understood that Figure 10 illustrates the interconnections of one third rank group; that is, a group of connections between all the illustrated adder units A, each of which needs to have an initial summation of 1 so that their respective enabling leads 552 may provide an output from all the gates $G_2$ and thus gate $G_3$ and open gates 24, $P_2$ and $P_3$. All the elements and interconnections thereof mentioned and implied by the preceding sentence comprise a third rank group, which is in the example illustrated in Figure 10, the highest rank group.

It should be recalled that each adder unit A adds only one column of digits; consequently, with large numbers, more than the number of adder units A constituting the highest rank group may be necessary. Therefore, several highest rank groups may be paralleled by connection of their highest rank gates. In the specific illustration of Figure 10, the third rank group, if more than nine columns were to be added, would be connected to a duplicate third rank group by serial connection between their respective gates $P_3$. Thus, the interconnection between each gate $P_3$ and the gates themselves form a third rank carry bus over which a carry may speedily bypass (besides be added into) all the adder units A encompassed by an enabled gate $P_3$.

In like manner, each gate $P_2$ heads a second rank group including one gate $G_2$, and three adjacent gates 24, plus their respective adder units. A second rank group, then corresponds to any one of the previously mentioned and illustrated groups 1, 2, and 3. All the gates $P_2$ and their interconnections (including the connection to the third rank carry bus from the last gate $P_2$ in one third rank group and back through the amplifier $A_3$ to the first gate $P_2$ in the next third rank group) comprise the second rank carry bus. The first rank carry bus includes all the gates 24 embraced under each highest order group and their interconnections including the connection from the last gate 24 in a second rank group to the second rank carry bus and back through amplifier $A_2$ to the first gate 24 in the next second rank group plus the connection between the last gate 24 in the highest rank group (the third rank group in Figure 10) through amplifiers $A_3$ and $A_2$ to the first gate 24 in the succeeding second rank group. Each gate 24 and its counting unit 20 may be considered a first rank group.

If a carry originates in any of the counting units CU in the second rank group 1 and if it is to be propagated out of that group, or if a carry arrives through amplifier 560 of group 1 and passes through each gate 24 in group 1, it will pass to the second rank carry bus in which the gates $P_2$ are connected. If all adder units A in the second rank group 2 are in condition to pass a carry (i.e., if all gates 24 in group 2 are enabled by lines 552) gate $G_2$ of that group will be providing an output to its $P_2$ gate, and the carry arriving on the second rank bus from group 1 will pass directly to gate $P_2$ of group 3 through gate $P_2$ of the second rank group over the second rank carry bus as well as to the counting units CU and gates $G_{24}$ of each group 2 and 3. If all group 3 adder units A are also in condition to propagate a carry, the carry will pass not only to groups 2 and 3 but to the third rank carry bus where the gates $P_3$ are connected, and that carry will be propagated on the third rank bus into and past as many succeeding third rank groups (succeeding third rank groups not shown) as have all their adder units in condition to transmit a carry. The succeeding third rank group whose gate $P_3$ is not enabled will only allow the carry to pass to the second rank bus of that third rank group and then into and past as many second rank groups whose gates $P_2$ have all their adder units A in condition to transmit a carry. The second rank group whose gate $P_2$ is not enabled, then, allows the carry to pass only to the first rank carry bus and the adder units A of that group. The carry then passes through as many gates 24 as successive counting units CU in that second rank group will allow by an enabling output on their respective lines 552.

It is evidence that the above described hierarchial principle may be applied to any number of ranks that the total number of adder units may require. If the number of digits to be added is so large that the total number of adder units A to be utilized in the addition requires more power than is available from one adder unit's carry output, amplifiers may be inserted in subsidiary branches of the circuit as illustrated in Figure 10 so that they do not delay the progress of the carry within each rank group.

If the speed of propagation of the carry through the gates $G_{24}$, $P_2$, $P_3$ and the like, is not a limiting factor but the available carry power is a limitation requiring organization of the adder units into ranks, then, for a given number of digit columns to be added, there will be a particular number of ranks which will give a minimum time for carry propagation through the whole system. Although each additional rank adds an amplifier time delay $t_1$ (assuming a $t_1$ delay for each amplifier $A_2$ or $A_3$) of a carry from one rank to the next and back again, each unit of delay $t_1$ permits passage of a carry to P times as many adder units A without further amplifier delay, where P is the number of gates between successive amplifiers in the carry bus next higher in rank than the carry bus to which the output of the amplifier causing the delay $t_1$ is connected. For example, a carry arriving at the junction 562 of the inputs to gate $P_2$ and amplifier $A_2$ in group 1 and proceeding through amplifier $A_2$, may go to only three adder units A before it meets with another amplifier $A_2$ in group 2; however, when the hierarchal or multiple rank system is used, that same carry may also be delivered over the second rank carry bus in parallel to the adder units A in groups 2 and 3 without additional delay since the delay $t_1$ through amplifier $A_2$ for groups 2 and 3 takes place during the same period of time as the delay $t_1$ through the amplifier $A_2$ for group 1; but the carry can go no farther over the second rank carry bus without being delayed, since upon passing gate $P_2$ of group 3, it must pass through an amplifier $A_3$ at the head of the next third rank group to continue on down the second rank carry bus. The delay $t_1$ through amplifier $A_3$ allows the carry to pass to another third rank group of adder units A without further delay through the second rank carry bus in that third rank group in the same manner as described for the first-mentioned third rank group.

It will be appreciated by those skilled in the art that the principle thus involved in the hierarchal system when carried to the $n$th degree causes at most an additional delay (because of the added carry bus ranks) of only $(n-1)t_1$, where $n$ is the total number of carry bus ranks. In the specific illustration of Figure 10, a total of three carry bus ranks is used, and consequently, there will only be a delay of $2t_1$ due to the hierarchal arrangement. However, during the delay $2t_1$ (assuming a system of successive third rank groups having 9 adder units A each as does the illustrated third rank group) a carry arriving at junction 564 of input leads to $P_3$ and $A_3$ may pass to 9 times P or a total of N adder units A, where P is the number of gates $P_3$ in the whole system. More generically, the total N may be computed by multiplying $a_1$ (the average number of adder units A per gate $P_2$) times $a_2$ (the average number of gates $P_2$ per gate $P_3$) times $a_3$ (the average number of gates $P_3$ per gate $P_4$, if there is a fourth rank) times . . . $a_{n-1}$ times $a_n$ where $n$ is the total number of carry bus ranks and $a_n$ is the total number of gates in the $n$th rank. If the system is pyramidal so that $a_1=a_2=a_3= \ldots a_{n-1}=a_n=a$, the total number N of adder units A in the system becomes $a^n$.

Any number of adder units A may be used in a second rank group, e.g., in group 1, but it will be appreciated that by using $n$ different carry bus ranks, the maximum number of adder units A between amplifiers $A_2$ in the first rank carry bus will be $$2\sqrt[n]{N}$$

where N is, as above, the total number of adder units A in the whole system. Assuming there is a normal delay $t_2$ created within each adder unit A without the hierarchy system and any additional amplification there would be a total delay of $Nt_2$; however, since each set of $$2\sqrt[n]{N}$$

(or fewer, e.g., those in group 1, 2, or 3) adder units are paralleled when using the hierarchal system, the maximum delay caused by the carry through each of the N adder units is $$2t_2\sqrt[n]{N}$$

Adding to that the delay $t_1$ caused by each of the additional $(n-1)$ carry bus ranks gives a total delay time of $$(n-1)t_1+2t_2\sqrt[n]{N}$$

for complete propagation of a carry through the system. It is apparent then that when N is large, even if $t_2$ is smaller than $t_1$ there is some value of $n$ which will cause the sum of $$(n-1)t_1+2t_2\sqrt[n]{N}$$

to be less than $Nt_2$. Thus, depending upon the ratio $$\frac{t_1}{t_2}$$

and N, a value of $n$ may be found which will minimize the total time required for a carry to be completely propagated. It should be noted that, if N is so large as to require insertion of amplifiers in the first rank carry bus when a hierarchal system is not used, $t_2$ will be of a magnitude comparable with $t_1$, and the benefits of multiple hierarchies will appear for relatively small values of N. Obviously, many modifications of technique can be employed with hierarchal organization and bistable devices may be used to control the carry bus to allow for delays in final carry arrival.

While the adder unit of various embodiments of this invention have been referred to only in relation to addition, it will be apparent that they may form the basic unit for other arithmetic operations. For example, any of the adder units illustrated in Figures 1 through 9 may be used in a parallel multiplication system. It would only be necessary to store the multiplicand in the several accumulators 26 of the system and then to simultaneously introduce the multipliers one by one to all the operand input leads 68 in the system. In order to shift the products resulting in the several accumulators 26 one column to the right as is necessary after each multiplier is added, a shifting pulse applied in parallel to a gate for each accumulator could be gated by a "1" output from that accumulator to its adjacent right hand accumulator at a third control input thereto (such as line 411 in Figures 8 and 9). At the same time the shifting pulse could be applied to each of the accumulators 26 in the multiplication system via the clear input line 79. As will be recalled, an input to line 150 via line 79, for example, does not pass current through control windings 116 and 122 but stops any reverting current present on line 140. Therefore, an input to additional and separate control windings (e.g., windings 405 and 407 of Figures 8 and 9—these, of course, may be added to any of the other embodiments of this invention) would not be counteracted by a shifting pulse on clear line 79. When all the digits in the multiplier have been added to each adder unit originally receiving a multiplicand and the shifts have all been made, the number standing in the accumulators will be the product. The hierarchal carry propagating system illustrated in Figure 10 may be used with such a multiplication system to hasten the addition of carries.

Other modifications of this invention not described herein will become apparent to those skilled in the art. Therefore, it is intended that the matter contained in the foregoing description and the accompanying drawings be interpreted as illustrative and not limitative, the scope of the invention being defined by the appended claims.

What is claimed is:

1. An adder unit for parallel binary arithmetic systems comprising accumulator means to retain an operand, means to shift said accumulator means between two states, means for receiving an incoming operand pulse, means coupled with the operand receiving means and the accumulator means for controlling the shifting of the accumulator means in accordance with the state thereof upon receipt of an operand pulse, means to produce a carry pulse in response to an operand pulse if the logic of addition of the operands so dictates, carry bus means, means responsive to the state of the accumulator means for gating an incoming carry pulse directly along the carry bus means when the accumulator means is in one of said states, means to receive an incoming carry pulse from the carry bus means, and means coupled with the carry receiving means and the accumulator means for controlling the shifting of the accumulator means in accordance with the state thereof upon receipt of a carry pulse, said accumulator means comprising a magnetic device having at least one magnetic core, said means for shifting the accumulator means including at least one control winding on the magnetic core, said means to produce a carry pulse and the operand responsive shift controlling means including separate outputs respectively of a first gating device which is connected with the output of the accumulator means to be enabled thereby for passing the operand pulse from one of said separate outputs to said control winding when the accumulator device is in a first one of its two possible states, said carry responsive shift controlling means including a second gating device connected to the output of the accumulator means so as to be enabled to pass a received carry pulse to said magnetic device when the accumulator is in said first state, and said means for gating an incoming carry directly along the carry bus means including a carry gating device connected with the output of the accumulator means so as to be enabled when the accumulator means is in the said first state.

2. An adder unit for parallel binary arithmetic systems comprising accumulator means to retain an operand, means to shift said accumulator means between two states, means for receiving an incoming operand pulse, means coupled with the operand receiving means and the accumulator means for controlling the shifting of the accumulator means in accordance with the state thereof upon receipt of an operand pulse, means to produce a carry pulse in response to an operand pulse if the logic of addition of the operands so dictates, carry bus means having an input, and an output connected to receive said carry pulse from said means to produce a carry pulse, means connected between said carry bus input and output and responsive to the state of the accumulator means for gating an incoming carry pulse directly along the carry bus means from said input to said output thereof when the accumulator means is in one of said states, means to receive an incoming carry pulse from the carry bus means input, and means coupled with the carry receiving means and the accumulator means for controlling the shifting of the accumulator means in accordance with the state thereof upon receipt of a carry pulse, said accumulator means comprising a bistable magnetic core device having at least one magnetic core with a power winding and control winding thereon, means for tending to draw pulses of power current through said power winding, and feedback means for continuously operating the accumulator in one of said states.

3. An adder unit for parallel binary arithmetic systems comprising accumulator means to retain an operand, means to shift said accumulator means between two states, means for receiving an incoming operand pulse, means coupled with the operand receiving means and the accumulator means for controlling the shifting of the accumulator means in accordance with the state thereof upon receipt of an operand pulse, means to produce a carry pulse in response to an operand pulse if the logic of addition of the operands so dictates, carry bus means having an input, and an output connected to receive said carry pulse from said means to produce a carry pulse, means connected between said carry bus input and output and responsive to the state of the accumulator means for gating an incoming carry pulse directly along the carry bus means from said input to said output thereof when the accumulator means is in one of said states, means to receive an incoming carry pulse from the carry bus means input, and means coupled with the carry receiving means and the accumulator means for controlling the shifting of the accumulator means in accordance with the state thereof upon receipt of a carry pulse, said accumulator means comprising at least one core of magnetic material, a power winding and a control winding thereon, circuit means connected with the power winding for intermittently tending to draw pulses of power current through the power winding, said circuit means including feedback means connected with the power winding circuit for passing core reverting current through the control winding, first control circuit input means for suppressing at least one pulse of said reverting current to prevent reverting of the core, whereby said circuit means thereafter prevents reverting current from flowing in the control winding, whereby the accumulator continues to operate in a first state, and second control circuit input means for supplying a pulse of core reverting current through said control winding for reverting said core between successive power current pulses, whereby the accumulator will operate in the second of its states.

4. A unit as in claim 3 wherein the accumulator means comprises a single magnetic core and wherein the said feedback means includes a delay device operative to cause a reverting current pulse, if any, to occur in the control winding during time periods when no power current is flowing in the power winding.

5. A unit as in claim 3 wherein the accumulator means comprises two magnetic core devices each having a power winding and a control winding and circuits therefor as recited in claim 3, the feedback means including means common to the two power winding circuits and control winding circuits, the arrangement being such that the output of one power winding circuit of one core device controls the reverting, if any, of the core of the second device, and vice versa, the arrangement being such that the unit will continuously operate in either one of its two states until the first control circuit input means or the second control circuit input means is operated to shift the state of the unit, whereafter the unit will continuously operate in the new state.

6. In a parallel binary arithmetic system, a plurality of adder units, each unit comprising accumulator means to retain an operand, said accumulator means being shiftable between two states from a first time period $t_1$ to a successive time period $t_2$ in a repetitive series of like periods $t$, means for receiving an incoming operand pulse, means to shift the accumulator in accordance with the state thereof upon receipt of an operand pulse, means to produce a carry pulse if the logic of addition of the operands in the system so dictates, carry bus means, means responsive to the state of the accumulator means for gating an incoming carry pulse directly along the carry bus means when the accumulator means is in one of said states, means to receive a carry pulse from the carry bus means, means responsive to received carry pulses for shifting the accumulator means from either of its two states, the operand and carry pulse receiving means including means for inhibiting shift of the accumulator means from either of its states if a carry and an operand pulse are received simultaneously, the adder units being interconnected by connection between the carry bus means of each unit, the system including operand pulse generating means connected with the operand pulse receiving means of each unit, the operand generating means including means for generating operand pulses in any time period $t$ and in successive periods $t$ such as said periods $t_1$ and $t_2$, the means for producing a carry pulse in each unit including means to produce a carry pulse in a time period $t$ following the preceding time period $t$ during which the logic of addition dictates the need for production of a carry pulse, the arrangement being such that operand pulses and carry pulses may be received in one or more of the adder units simultaneously.

7. An adder unit for parallel binary arithmetic systems comprising an accumulator means having a first input and a second input and an output, the accumulator means being shiftable between two states to cause the output to assume a 1 or a 0 condition in response to an input pulse on the first or second inputs respectively, an operand input connected to the first input of the accumulator means, first gating means and second gating means, the first and second gating means having two enabling inputs, one input of each of the first and second gating means being connected with the output of the accumulator means, the second input of the first gating means being connected with the operand input, a carry bus including a carry input section, a carry output section, and a carry gating means between said input and output sections for passing a carry pulse along the carry bus when fully enabled, the second input of the second gating means being connected with said carry input section, the carry input section being further connected to the first input of the accumulator means, the carry gating means having as its first enabling input means the carry bus input section, and having as its second enabling input means a connection to the output of the accumulator means, the first gating means having a first output connected with the second accumulator input means, the second gating means having an output connected to the second accumulator input means, the first gating means producing a carry pulse when fully enabled and having a second output therefor coupled with the carry bus output section, the arrangement being such that the unit will respond to received operand pulses and carry pulses to show new sums at the accumulator output and to produce or pass a carry in accordance with the logic of binary addition.

8. A unit as in claim 7 wherein said carry gating means comprises diode resistance gating elements.

9. A unit as in claim 7 wherein the coupling of the second output of the first gating means to the carry bus output section includes a carry amplifier.

10. A unit as in claim 7 wherein the accumulator means has a second output whose condition is 1 when said first mentioned output of the accumulator means is 0, and vice versa, and wherein said carry gating means comprises a diode pulse transformer gate controlled by the output of said second output of the accumulator means.

11. A unit as in claim 7 wherein the accumulator means comprises a bistable magnetic device having at least one magnetic core with a power winding and a control winding thereon, means for tending to draw pulses of power current through said power winding, and feedback means for supplying reverting current to the first input of said accumulator means to operate the accumulator in one of said states, the power winding being connected to said output of the accumulator means and the control winding forming said first and second inputs to the accumulator means.

12. A unit as in claim 11 wherein the accumulator means comprises a single magnetic core and wherein said feedback means includes a delay device operative to cause a reverting current pulse, if any, to occur in the control winding during time periods when no power current is flowing in the power winding.

13. A unit as in claim 11 wherein said first, second, and carry gating means each comprise diode resistance gating elements.

14. A unit as in claim 13 wherein the second output of the first gating means is coupled with the carry bus output section by a carry amplifier, said amplifier comprising a magnetic core device having a control winding connected to said second output of the first gating means and an output winding connected with the carry bus output section.

15. A unit as in claim 11 wherein said core of the bistable magnetic device has a second power winding wound oppositely to the first power winding, one end of the second power winding being connected to the means tending to draw pulses of power current, and wherein said carry gating means comprises a diode pulse transformer gate controlled by the output from the other end of said second power winding.

16. A unit as in claim 7 wherein said carry gating means comprises a magnetic core device having a biased control winding and an output winding thereon, said windings being wound in opposition to each other, the output winding being coupled between the carry bus input and output sections, one end of the control winding being coupled to said first input of the accumulator means and the other end of the control winding being coupled to the second input of said accumulator means, the arrangement being such that a carry pulse will pass through said output winding substantially unattenuated when said control winding is energized by an input pulse to said first input of the accumulator means and a carry pulse is substantially blocked from passing through said output winding when there is an input pulse to the second input of said accumulator means.

17. A unit as in claim 16 wherein said output winding of the carry gating means is coupled to the carry bus output section by a unidirectional device.

18. A unit as in claim 17 wherein said unidirectional device is a steadily biased magnetic core device.

19. An adder unit for parallel binary arithmetic systems comprising an accumulator device having a magnetic core, a power winding thereon forming an output of the accumulator device, and a control winding thereon forming a first input and a second input of the accumulator device, said accumulator device being shiftable between two states to cause the output to assume a 1 or 0 condition in response to an input pulse on the first or second inputs respectively, an operated input connected to the first input of the accumulator device, first gating means and second gating means, the first, and second gating means having two enabling inputs, a first delay device interconnecting the output of the accumulator device to one enabling input of each first and second gating means and with said first input of the accumulator device, the first delay device being thereby in a feedback circuit to the control winding, the second input of the first gating means being connected with the operand input, a carry bus including a carry input section, a carry output section, and carry gating means between said input and output sections for passing a carry pulse along the carry bus when enabled, a second delay device interconnecting the carry input section with said second enabling input of the second gating means and with said first input of the accumulator device, said carry gating means comprising a bistable magnetic core device having a control winding and output winding circuit means, the latter including a coupling thereof to said carry bus between the input and output sections thereof and to said power winding of the accumulator device for passing a carry pulse to the carry output section, the control winding of the carry gating means being coupled at one end thereof to said first input of the accumulator device, the second gating means having a first output connected to the other end of the control winding of said carry gating means, the first gating means producing a carry pulse when fully enabled and having a first output therefor coupled with the carry bus output section, the first and second gating means having a second output connected to the second input of said accumulator device, the arrangement being such that the unit will respond to received operand pulses and carry pulses as such may be presented to show new sums at the accumulator output and to produce or pass a carry pulse, all in accordance with the logic of binary addition.

20. A unit as in claim 19 wherein said output winding circuit means includes a single winding one end of which is connected to said carry bus and the other end of which is coupled to said power winding.

21. A unit as in claim 19 wherein said output winding circuit means includes a first and second winding and a source of negative-going pulses coupled to the first winding at one end thereof, said first winding being coupled at its other end to said carry bus input section, the second winding being coupled to the carry bus output section and to said power winding of the accumulator device.

22. A unit as in claim 19 wherein said first output of the first gating means is coupled with the carry bus output section by a carry amplifier.

23. A unit as in claim 22 wherein the carry amplifier comprises a transformer coupled at its output to said carry bus and a bistable magnetic core device having a biased control winding connected to said first output of the first gating means and a power winding coupled to the input of said transformer and wherein said output winding circuit means of the carry gating means includes a source of negative-going pulses coupled therein so that a carry pulse issuing from said transformer may be returned thereto through said output winding means to the carry gating means.

24. An adder unit for parallel binary arithmetic systems comprising an accumulator means having first, second, and third inputs and an output, the accumulator being shiftable between two states to cause the output to assume a 1 condition in response to a pulse on the first or third inputs and a 0 condition in response to a pulse on the second input, an operand input connected to the first input of the accumulator means, first gating means, second gating means, and third gating means, the first and second gating means having two enabling inputs and the third gating means having three enabling inputs, one input of each of the second and third gating means being connected with the output of the accumulator means, the first input of the first gating means and the second input of the second and third gating means being connected with the operand input, a carry bus including a carry input section, a carry output section and a carry gating means coupled between said input and output sections for passing a carry pulse along the carry bus when fully enabled, the second input of the first gating means and the third input of the third gating means being connected with said carry input section, the carry input section being further connected to the first input of the accumulator means, the carry gating means having as its first enabling input means the carry bus input section, and having as its second enabling input means a connection to the output of the accumulator means, the first and second gating means and the carry gating means each producing a carry pulse when fully enabled and having a first output therefor coupled to the input of the carry bus output section, the first and second gating means and the carry gating means each having a second output connected with said second input of the accumulator means, the third gating means having an output connected with the third input of the accumulator means, the arrangement being such that the unit will respond to operand and carry pulses received simultaneously and thereby prevent a shift of the accumulator means from either of said conditions and will respond to said pulses received separately and simultaneously to produce or pass a carry pulse and to show final summation at the accumulator output, all in accordance with the logic of binary addition.

25. A unit as in claim 24 wherein each of said first, second, and carry gating means is coupled to the carry bus output section by a carry amplifier.

26. A unit as in claim 25 wherein the carry amplifier comprises a bistable magnetic device having at least one magnetic core, a power winding thereon coupled to said carry bus output section, and a control winding thereon forming an input of said amplifier.

27. A unit as in claim 26 wherein the first, second, third and carry gating means each comprise diode resistance gating elements and said accumulator means comprises a bistable magnetic device.

28. A unit as in claim 24 wherein the carry gating means comprises diode resistance gating elements.

29. A unit as in claim 24 wherein the accumulator means comprises at least one core of magnetic material having a power winding circuit means forming said output of the accumulator means and control winding circuit means forming said first, second, and third inputs of the accumulator means, feedback means intercoupling the power winding means and the first input of the control winding means for passing reverting current, if any, to the control winding means to maintain said 1 condition when obtaining.

30. A unit as in claim 29 wherein the power winding circuit means includes two power windings wound in opposition, one winding forming said output of the accumulator means, the output of the second winding assuming said 0 condition when a 1 output of the accumulator means obtains, and vice versa.

31. A unit as in claim 30 wherein said carry gating means comprises diode resistance gating elements.

32. A unit as in claim 30 wherein said carry gating means comprises a diode pulse transformer gate controlled by the output from said second power winding.

33. A unit as in claim 30 wherein the carry input section and the operand input are connected to the first input of the accumulator means by a fourth gating means and fifth gating means, respectively, said fourth and fifth gating means being enabled for passing carry and operand pulses thereto by a 1 condition at the output of said second power winding.

34. A unit as in claim 29 wherein the control winding circuit means comprises two control windings, the ends of one control winding forming, respectively, said first and second inputs of the accumulator means and the second control winding forming said third input of the accumulator means.

35. In a parallel binary arithmetic system, a plurality of adder unit, each unit comprising accumulator means to retain an operand, said accumulator means being shiftable between two states from a first time period $t_1$ to a successive time period $t_2$ in a repetitive series of like periods $t$, means for receiving an incoming operand pulse, means to shift the accumulator in accordance with the state thereof upon receipt of an operand pulse, means to produce a carry pulse if the logic of addition of the operands in the system so dictates, carry input means, means to receive a carry pulse from the carry input means, means responsive to received pulses for shifting the accumulator means, the operand and carry pulse receiving means including means for inhibiting shift of the accumulator means from either of its states if a carry and an operand pulse are received simultaneously, the adder units being interconnected by connection between the carry means of each unit, the system including operand pulse generating means connected with the operand pulse receiving means of each unit, the operand generating means including means for generating operand pulses in any time period $t$ and in successive periods $t$ such as said periods $t_1$ and $t_2$, the means for producing a carry pulse in each unit including means to produce carry pulses within the time periods $t$ when the logic of addition dictates the need for production of a carry pulse, the arrangement being such that operand pulses and carry pulses may be received in one or more of the adder units simultaneously.

36. In a parallel arithmetic system, a group comprising any two or more interconnected adder units for successive digits of increasingly greater significance, each adder unit comprising a counter unit, a carry bus input section and output section, and a first rank carry gate means between said input and output sections, enabling means connected between each counter unit and its first rank carry gate means, the carry input and output sections being interconnected to form a first rank carry bus, a second rank carry gate means having two or more enabling inputs one from each adder unit, a second rank carry bus input section connected as an input to said second rank carry gate, a second rank carry bus output section connected as an output of said second rank carry gate means, the second rank carry bus input section being connected with the carry bus input section of the least significant digit adder unit of the group and the second rank carry bus output section being connected with the first rank carry bus output section of the greatest significant digit adder unit of the group, the arrangement being such that a carry pulse applied to said carry bus input section of the first adder unit and to the second rank carry bus input section will pass through the second rank carry gate means when the logic of addition in each of the adder units is such as to call for passing a carry.

37. A system as in claim 36 including at least two or more additional adder units forming at least one additional group, each group being as recited in claim 36, a third rank carry gate means, a third rank carry bus input section connected as an input to said third rank carry gate means, a third rank carry bus output section connected as an output from said third rank carry gate means, enabling means for the third rank carry gate means for opening the third rank carry gate means in response to all of the adder units being set to pass a carry, the third rank carry bus input section being connected with the first rank carry bus input section of the said least significant digit adder unit of the group of adder units of lesser digit significance, the third rank carry bus output section being connected with the first rank carry output section of the said greatest significant digit adder unit of the group of adder units or greater digit significance, the arrangement being such that a carry pulse applied to the carry input of the said least significant adder unit and to the third rank carry bus input section will pass through the third rank carry gate means when the logic of addition in all of the adder units is such as to call for passing a carry.

38. A parallel adder system comprising a chain of N adder units, each adder unit comprising a counter unit, a carry bus input section and output section, a carry gating means between said input and output sections, and enabling means connected between each counter unit and its carry gating means, the input and output sections and gating means forming a carry bus section, the carry input and output sections of the successive units of the chain being interconnected to form a first rank carry bus, second rank to $n$th rank additional carry buses, the second rank carry bus having a predetermined number of carry gating means therein each enabled by a predetermined number of adder units of the chain, a connection from the second rank carry bus to the first rank carry bus, each connection being between two of said second rank gating means and the first rank carry bus in a connection between two of the first rank carry gating means, whereby each second rank carry bus gating means encompasses a predetermined group of adder units, each successive carry bus rank from the second rank to the $n$th rank including carry gating means similarly connected for encompassing two or more gating means of the next lower rank and being enabled when all of the adder units encompassed by the gating means call for passing a carry, the $n$th rank carry bus having at least one gating means therein.

39. A system as in claim 38 wherein at least one of said connections between predetermined ranks of carry bus sections of two adjacent ranks includes means for directly passing signals from the lower rank bus section to the higher rank section and includes means for amplifying signals passing toward sections of higher digit significance in the lower rank bus.

40. A system as in claim 38 wherein each of the said connections between predetermined carry buses of two adjacent ranks includes means for directly passing signals from the lower rank carry bus to the higher rank carry bus and includes means for amplifying signals passing toward sections of higher digit significance in the rank bus, said connections between ranks dividing the N units of the first rank into a plurality of groups with the number of adder units in each group being at most $$2\sqrt[n]{N}$$

$n$ being selected so that $$(n-1)t_1 + 2t_2\sqrt[n]{N}$$

will be less than $Nt_2$, where $t_2$ is the delay time for a carry pulse passing through any one of the adder units and where $t_1$ is the delay time of each of said amplifying means.

41. A parallel binary arithmetic system comprising a plurality of adder units, each unit comprising an accumulator means to retain an operand, means to shift said accumulator means between two states, means for receiving an incoming operand pulse, means coupled with the operand receiving means and the accumulator means for controlling the shifting of the accumulator means in accordance with the state thereof upon receipt of an operand pulse, means to produce a carry pulse in response to an operand pulse if the logic of addition of the operands so dictates, carry bus means having an input, and an output connected to receive said carry pulse from said means to produce a carry pulse, means connected between said carry bus input and output and responsive to the state of the accumulator means for gating an incoming carry pulse directly along the carry bus means from said input to said output thereof when the accumulator means is in one of said states, means to receive an incoming carry pulse from the carry bus means input, and means coupled with the carry receiving means and the accumulator means for controlling the shifting of the accumulator means in accordance with the state thereof upon receipt of a carry pulse, means for supplying operand pulses to said operand pulse receiving means in parallel, said units being interconnected in a chain by connection between the carry bus means of each unit so as to form a system carry bus for propagation of carry pulses therealong.

42. A system as in claim 41 wherein the accumulator means of each unit is shiftable between two states from a first time period $t_1$ to a successive time period $t_2$ in repetitive series of like time periods $t$, wherein the means of each unit for producing a carry pulse is arranged to produce such carry pulses within time periods $t$, the system including operand pulse generating means connected with the operand pulse receiving means of each unit, the operand generating means including means capable of generating operand pulses in the number required and applying same simultaneously to all of the units in any time period $t$ and in successive periods $t$ such as said periods $t_1$ and $t_2$.

43. A parallel binary arithmetic system comprising a plurality of adder units, each adder unit comprising an accumulator means having a first input and a second input and an output, the accumulator means being shiftable between two states to cause the output to assume a 1 or 0 condition in response to an input pulse on the first or second inputs respectively, an operand input connected to the first input of the accumulator means, first gating means and second gating means, the first and second gating means having two enabling inputs, one input of each of the first and second gating means being connected with the output of the accumulator means, the second input of the first gating means being connected to the operand input, a carry bus including a carry input section, a carry output section, and a carry gating means between said input and output sections for passing a carry pulse along the carry bus when fully enabled, the second input of the second gating means being connected with said carry input section, the carry input section being further connected to the first input of the accumulator means, the carry gating means having as its first enabling input means the carry bus input section and having as its second enabling input means a connection to the output of the accumulator means, the first gating means having a first output connected with the second accumulator input means, the second gating means having an output connected to the second accumulator input means, the first gating means producing a carry pulse when fully enabled and having a second output therefor coupled with the carry bus output section, the arrangement being such that the unit will respond to received operand pulses and carry pulses to show new sums at the accumulator output and to produce or pass a carry in accordance with the logic or binary addition, the units being interconnected in a chain by connection of the carry bus output and input sections of adjacent units.

44. A parallel binary arithmetic system comprising a plurality of adder units, each unit comprising an accumulator means having first, second, and third inputs and an output, the accumulator being shiftable between two states to cause the output to assume a 1 condition in response to a pulse on the first or third inputs, and a 0 condition in response to a pulse on the second input, an operand input connected to the first input of the accumulator means, first gating means, second gating means, and third gating means, the first and second gating means having two enabling inputs, and the third gating means having three enabling inputs, one input of each of the second and third gating means being connected to the output of the accumulator means, the first input of the first gating means and the second input of the second and third gating means being connected with the operand input, a carry bus including a carry input section, a carry output section, and a carry gating means coupled between said input and output sections for passing a carry pulse along the carry bus when fully enabled, the second input of the first gating means and the third input of the third gating means being connected with said carry input section, the carry input section being further connected to the first input of the accumulator means, the carry gating means having as its first enabling input means the carry bus input section, and having as its second enabling input means a connection to the output of the accumulator means, the first and second gating means and the carry gating means each producing a carry pulse when fully enabled, and having a first output therefor coupled to the input of the carry bus output section, the first and second gating means and the carry gating means each having a second output connected with said second input of the accumulator means, the third gating means having an output connected with the third input of the accumulator means, the arrangement being such that the unit will respond to operand and carry pulses received simultaneously, and thereby present shift of the accumulator means from either of said conditions and will respond to said pulses received separately and simultaneously to produce or pass a carry and to show final summation to the accumulator output, all in accordance with the logic of binary addition, the adder units being interconnected in a chain by connection of the carry bus output sections and carry bus input sections of adjacent units.

45. A system as in claim 44 wherein the accumulator means of each unit is shiftable between said two states from a first time period $t_1$ to a successive time period $t_2$ in a repetitive series of like periods $t$, wherein the means of each unit for producing a carry pulse is arranged to produce such carry pulses within time periods $t$, the system including operand pulse generating means connected with the operand pulse receiving means of each unit, the operand generating means including means capable of generating operand pulses in the number required and applying said pulses simultaneously to all units of the chain in any time period $t$ and in successive periods $t$ such as said periods $t_1$ and $t_2$.

References Cited in the file of this patent
UNITED STATES PATENTS

| | | |
|---|---|---|
| 2,519,513 | Thompson | Aug. 22, 1950 |
| 2,634,052 | Bloch | Apr. 7, 1953 |
| 2,697,178 | Isborn | Dec. 14, 1954 |
| 2,715,997 | Hill | Aug. 23, 1955 |
| 2,719,670 | Jacobs et al. | Oct. 4, 1955 |
| 2,729,808 | Auerbach et al. | Jan. 3, 1956 |
| 2,731,203 | Miles | Jan. 17, 1956 |
| 2,734,684 | Ross et al. | Feb. 14, 1956 |
| 2,735,005 | Steele | Feb. 14, 1956 |
| 2,735,936 | Gridley | Feb. 21, 1956 |
| 2,741,758 | Cray | Apr. 10, 1956 |

UNITED STATES PATENT OFFICE
CERTIFICATE OF CORRECTION

Patent No. 2,949,230

August 16, 1960

John Presper Eckert, Jr.

It is hereby certified that error appears in the printed specification of the above numbered patent requiring correction and that the said Letters Patent should read as corrected below.

Column 4, line 56, for "but" read -- bus --; column 5, line 24, for "interconections" read -- interconnections --; column 18, line 15, for "and%or" read -- and/or --; line 27, for "N/2" read -- $\frac{N}{2}$ --; column 23, line 59, for "G2" read -- $G_2$ --; column 29, lines 56 and 57, for "an operated input" read -- an operand input --; column 30, line 10, for "but" read -- bus --.

Signed and sealed this 18th day of April 1961.

(SEAL)

Attest:

ERNEST W. SWIDER
Attesting Officer

DAVID L. LADD
Commissioner of Patents